(12) United States Patent
Koike et al.

(10) Patent No.: US 9,978,117 B2
(45) Date of Patent: May 22, 2018

(54) SEMICONDUCTOR APPARATUS AND HIGH SPEED IMAGE DATA PROCESSING

(71) Applicant: Renesas Electronics Corporation, Tokyo (JP)

(72) Inventors: Manabu Koike, Tokyo (JP); Akihiro Yamamoto, Tokyo (JP); Atsushi Nakamura, Tokyo (JP); Hideaki Kido, Tokyo (JP)

(73) Assignee: Renesas Electronics Corporation, Tokyo ( * ) Notice: Subject to any disclaimer, the term of this patent is extended or adjusted under 35 U.S.C. 154(b) by 369 days.

(21) Appl. No.: 14/164,211

(22) Filed: Jan. 26, 2014

(65) Prior Publication Data
US 2014/0218382 A1 Aug. 7, 2014

(30) Foreign Application Priority Data

Feb. 1, 2013 (JP) .................................. 2013-018224

(51) Int. Cl.
*G06T 1/60* (2006.01)

(52) U.S. Cl.
CPC ........................................ *G06T 1/60* (2013.01)

(58) Field of Classification Search
CPC ........................................................ G06T 1/60
USPC ........................................................ 345/545
See application file for complete search history.

(56) References Cited

U.S. PATENT DOCUMENTS

| | | | | |
|---|---|---|---|---|
| 5,767,864 A | * | 6/1998 | Kimura | G06F 7/575 345/519 |
| 5,838,337 A | * | 11/1998 | Kimura | G06F 7/575 345/505 |
| 6,745,265 B1 | * | 6/2004 | Sindalovsky | G06F 5/12 370/229 |
| 7,609,273 B1 | * | 10/2009 | Donovan | G06T 15/005 345/530 |
| 8,860,741 B1 | * | 10/2014 | Juffa | G09G 5/36 345/530 |
| 2007/0159664 A1 | | 7/2007 | Tone | |
| 2007/0283056 A1 | * | 12/2007 | Miro Panades | G06F 5/14 710/57 |
| 2008/0270744 A1 | * | 10/2008 | Hashimoto | G06F 13/1673 711/217 |
| 2010/0228920 A1 | | 9/2010 | Tomi | |

(Continued)

FOREIGN PATENT DOCUMENTS

| | | |
|---|---|---|
| JP | H4-015764 A | 1/1992 |
| JP | H5-128240 A | 5/1993 |

(Continued)

OTHER PUBLICATIONS

Office Action dated Jul. 26, 2016, in Japanese Patent Application No. 2013-018224.

*Primary Examiner* — Barry Drennan
*Assistant Examiner* — Terrell Robinson
(74) *Attorney, Agent, or Firm* — Shapiro, Gabor and Rosenberger, PLLC

(57) ABSTRACT

A semiconductor apparatus pertaining to one embodiment has: a first processor that operates by a first program and reads pixel data from a storage unit; a second processor that operates by a second program, performs processing to the pixel data, and writes the processed pixel data back to the storage unit; and a buffer circuit that transfers the pixel data from the first processor to the second processor.

20 Claims, 17 Drawing Sheets

(56) References Cited

U.S. PATENT DOCUMENTS

| | | | |
|---|---|---|---|
| 2011/0069065 A1 | 3/2011 | Hiwada et al. | |
| 2012/0110283 A1 | 5/2012 | Nakazono et al. | |
| 2012/0268472 A1* | 10/2012 | Herrmann | G06F 9/325 |
| | | | 345/522 |

FOREIGN PATENT DOCUMENTS

| | | |
|---|---|---|
| JP | 2001-092984 A | 4/2001 |
| JP | 2007-188196 A | 7/2007 |
| JP | 2010-205083 A | 8/2010 |
| JP | 2011-071657 A | 4/2011 |
| JP | 2011-090663 A | 5/2011 |
| JP | 2012-098884 A | 5/2012 |

\* cited by examiner

SEMICONDUCTOR APPARATUS AND HIGH SPEED IMAGE DATA PROCESSING

CROSS-REFERENCE TO RELATED APPLICATIONS

This application is based upon and claims the benefit of priority from Japanese patent application No. 2013-018224, filed on Feb. 1, 2013, the disclosure of which is incorporated herein in its entirety by reference.

BACKGROUND

Field of the Invention

The present invention relates to a semiconductor apparatus and a data processing method of the same and, for example, to a semiconductor apparatus that processes image data and a data processing method of the semiconductor apparatus.

Description of the Related Art

In recent years, various information has been read from images taken with a camera to control a device. High-speed processing is required for image processing utilized for control of such device. In addition, there exists a plurality of image processing utilized for the control of the device, and a semiconductor apparatus utilized for such image processing needs to handle a plurality of image processing methods. Therefore, a technology to increase speed of image rendering among image processing is disclosed in Japanese Unexamined Patent Application Publication No. 2011-090663.

The inventors of the present application have found out various problems on development of a semiconductor apparatus used for an image processing apparatus etc. Each embodiment disclosed in the present application, for example, provides a semiconductor apparatus suitable for an image processing apparatus. Other problems and new features will be apparent from description of the specification and accompanying drawings.

SUMMARY

A semiconductor apparatus pertaining to one embodiment has: a first processor that operates by a first program and reads pixel data from a storage unit; a second processor that operates by a second program, performs processing to the pixel data, and writes the processed pixel data back to the storage unit; and a buffer circuit that transfers the pixel data from the first processor to the second processor.

According to the above-described one embodiment, can be provided a good quality of semiconductor apparatus and image processing apparatus provided therewith.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

<First Embodiment>

Figure 1:
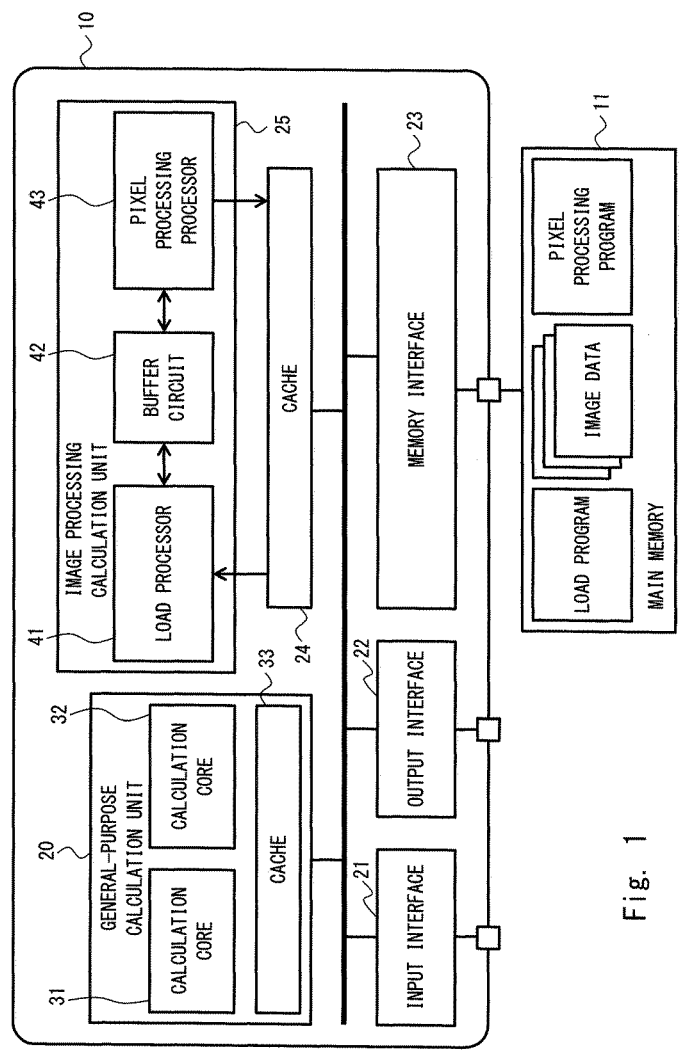
FIG. 1 is a block diagram of a semiconductor apparatus according to a first embodiment.

Hereinafter, embodiments will be explained with reference to drawings. It is to be noted that since the drawings are simple, the technical scope of the embodiments must not be construed narrowly on the ground of description of the drawings. In addition, the same symbol is attached to the same component, and overlapping description is omitted.

Although the following embodiments will be explained, divided into a plurality of sections or embodiments if necessary for convenience, except for a case particularly clearly expressed, they are not mutually unrelated, and one has relationships, such as a modification example, an application example, detailed explanation, and supplementary explanation of a part or an entire of the other. In addition, in the following embodiments, when referring to the number of components etc. (including the number, a numeric value, an amount, a range, etc.), they are not limited to the specific number but may be not less than or not more than the specific number except for a case where they are particularly clearly expressed and where they are theoretically clearly limited to the specific number.

In addition, in the following embodiments, a component (including an operation step etc.) is not necessarily indispensable, except for a case where it is particularly clearly expressed and where it is considered to be theoretically clearly indispensable, etc. Similarly, in the following embodiments, when a shape, a position relationship, etc. of a component etc. are referred to, a component etc. that substantially resemble or are similar to the shape shall be included, except for a case where they are particularly clearly expressed and where they are considered to be theoretically clearly not right. This also applies to the above-described number of components etc. (including the number, the numeric value, the amount, the range, etc.).

Furthermore, for clarity of explanation, the following description and drawings are appropriately omitted and simplified. In addition, each component described in the drawings as a functional block that performs various processing can be configured with a CPU, a memory, and an other circuit as hardware, and is achieved by programs loaded in the memory, etc. as software. Accordingly, it is understood by those skilled in the art that these functional blocks can be achieved in various forms by only the hardware, only the software, or a combination thereof, and the present invention is not limited to any one of them. It is to be noted that the same symbol is attached to the same component in each drawing, and that overlapping explanation is omitted as needed.

In addition, the above-mentioned programs are stored using various types of non-transitory computer readable media, and can be supplied to a computer. The non-transitory computer readable media include various types of tangible storage media. Examples of the non-transitory computer readable medium include: a magnetic recording medium (for example, a flexible disk, a magnetic tape, and a hard disk drive); a magneto-optical recording medium (for example, a magneto-optical disk); a CD-ROM (Read Only Memory); a CD-R; a CD-R/W; and a semiconductor memory (for example, a mask ROM, a PROM (Programmable ROM), an EPROM (Erasable PROM), a flash ROM, a RAM (Random Access Memory)). In addition, the programs may be supplied to the computer by various types of transitory computer readable media. Examples of the transitory computer readable medium include: an electrical signal; an optical signal; and an electromagnetic wave. The transitory computer readable medium can supply the program to the computer through a wired communication channel, such as an electric wire and an optical fiber, or a wireless communication channel.

<Explanation of Semiconductor Apparatus in which Image Processing Apparatus Pertaining to First Embodiment is Mounted>

First, an image processing apparatus pertaining to a first embodiment may be configured as a single semiconductor apparatus having an image processing function, and may be configured as one semiconductor apparatus together with other functional circuits. Therefore, there will be explained an example where the image processing apparatus pertaining to the first embodiment is configured as one semiconductor apparatus together with other functional circuits.

In FIG. 1, shown is a block diagram of a semiconductor apparatus pertaining to the first embodiment. In an example shown in FIG. 1, a data processing apparatus is constructed by a semiconductor apparatus 10 and a storage unit (for example, a main memory 11). The semiconductor apparatus 10 includes the image processing apparatus pertaining to the first embodiment. The semiconductor apparatus 10 has: a general-purpose calculation unit 20; an input interface 21; an output interface 22; a memory interface 23; a cache memory 24; and an image processing calculation unit 25.

The general-purpose calculation unit 20 has calculation cores 31 and 32, and a cache 33. The general-purpose calculation unit 20, for example, performs analysis of image data accumulated in the main memory 11 or control of an other device, etc. by carrying out a program in the calculation core. The cache 33 is a temporary storage utilized in calculation performed by the calculation cores 31 and 32.

The input interface 21 receives a signal from an input device, such as a camera or a sensor that is connected outside, and accumulates it in the main memory 11 etc. The output interface 22 sends a control signal to an other device connected outside. The memory interface 23 is an input/output interface of the main memory 11 connected outside. The cache memory 24 is a temporary storage utilized in processing of the image processing calculation unit 25.

The image processing calculation unit 25 is a block that performs image processing in the image processing apparatus pertaining to the first embodiment. The image processing calculation unit 25 has: a load processor 41; a buffer circuit 42; and a pixel processing processor 43. Hereinafter, the image processing apparatus including the image processing calculation unit 25 will be explained.

It is to be noted that the image processing apparatus is mounted in the semiconductor apparatus 10 together with the other functional blocks as described above, and that thereby processing other than the image processing can be performed at high speed.

<Configuration Example of Image Processing Apparatus 1 Pertaining to First Embodiment>

Figure 2:
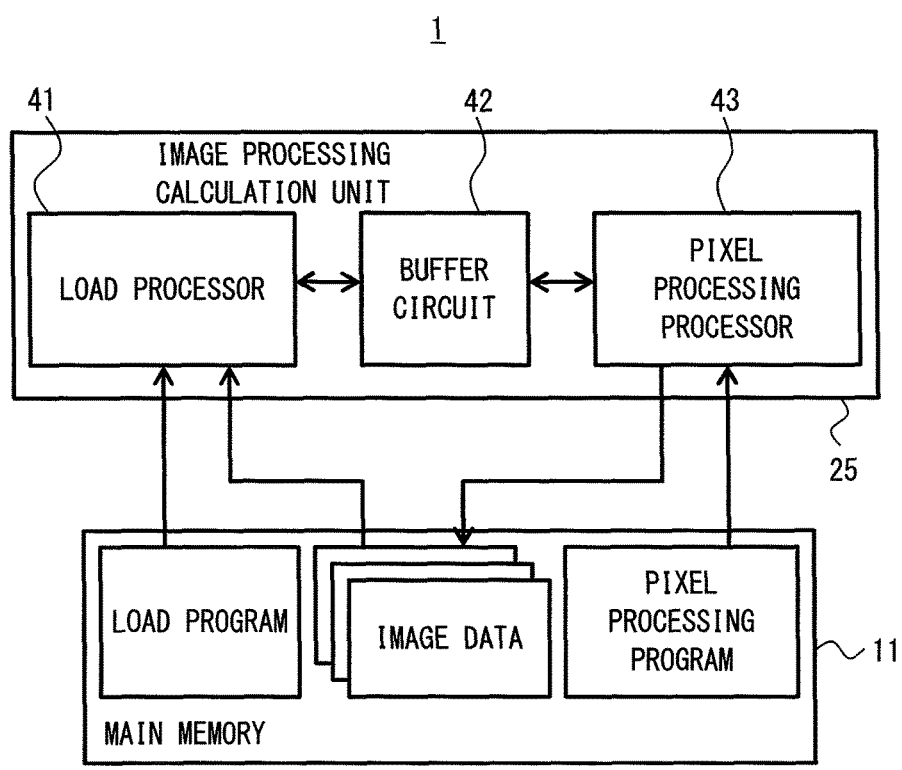
FIG. 2 is a block diagram of an image processing apparatus according to the first embodiment.

In FIG. 2, shown is a block diagram of an image processing apparatus 1 pertaining to the first embodiment. As shown in FIG. 2, the image processing apparatus 1 pertaining to the first embodiment can be configured with the image processing calculation unit 25 and the main memory 11 of FIG. 1. It is to be noted that although other circuits, such as the cache memory 24 and the memory interface 23, may be needed in implementation, these circuits provide incidental processing among processing performed in the image processing apparatus 1 pertaining to the first embodiment, they are not related to essential operation, and thus explanation thereof is omitted here.

As shown in FIG. 2, the image processing calculation unit 25 has: a first processor (for example, the load processor 41); the buffer circuit 42; and a second processor (for example, the pixel processing processor 43). In addition, a first program (for example, a load program), a second program (for example, a pixel processing program), and image data are included in the main memory 11.

The load processor 41 reads image data from the storage unit in accordance with a scheme specified by the load program. Here, the load processor 41 reads the image data in a unit of pixel data. In addition, at least one pixel of pixel data is included in the unit of pixel data that the load processor 41 reads. In addition, the load processor 41 reads the load program from the main memory 11, and executes the read load program.

The buffer circuit 42 holds the pixel data that the load processor 41 has read. In addition, the buffer circuit 42 outputs the held pixel data to the pixel processing processor 43 in accordance with a read request from the pixel processing processor 43. It is to be noted that although details will be mentioned later, the pixel processing processor 43 transmits coordinate information corresponding to the pixel data to the load processor 41 together with the pixel data.

The pixel processing processor 43 reads the pixel data from the buffer circuit 42, processes the pixel data in accordance with a scheme specified by the pixel processing program, and writes the processed pixel data back to the main memory 11. That is, the pixel processing processor 43 writes the processed pixel data back to the main memory 11 from which the load processor 41 has read the pixel data.

Subsequently, there will be explained in more detail the load processor 41, the buffer circuit 42, and the pixel processing processor 43.

<Explanation of Load Processor 41>

Figure 3:
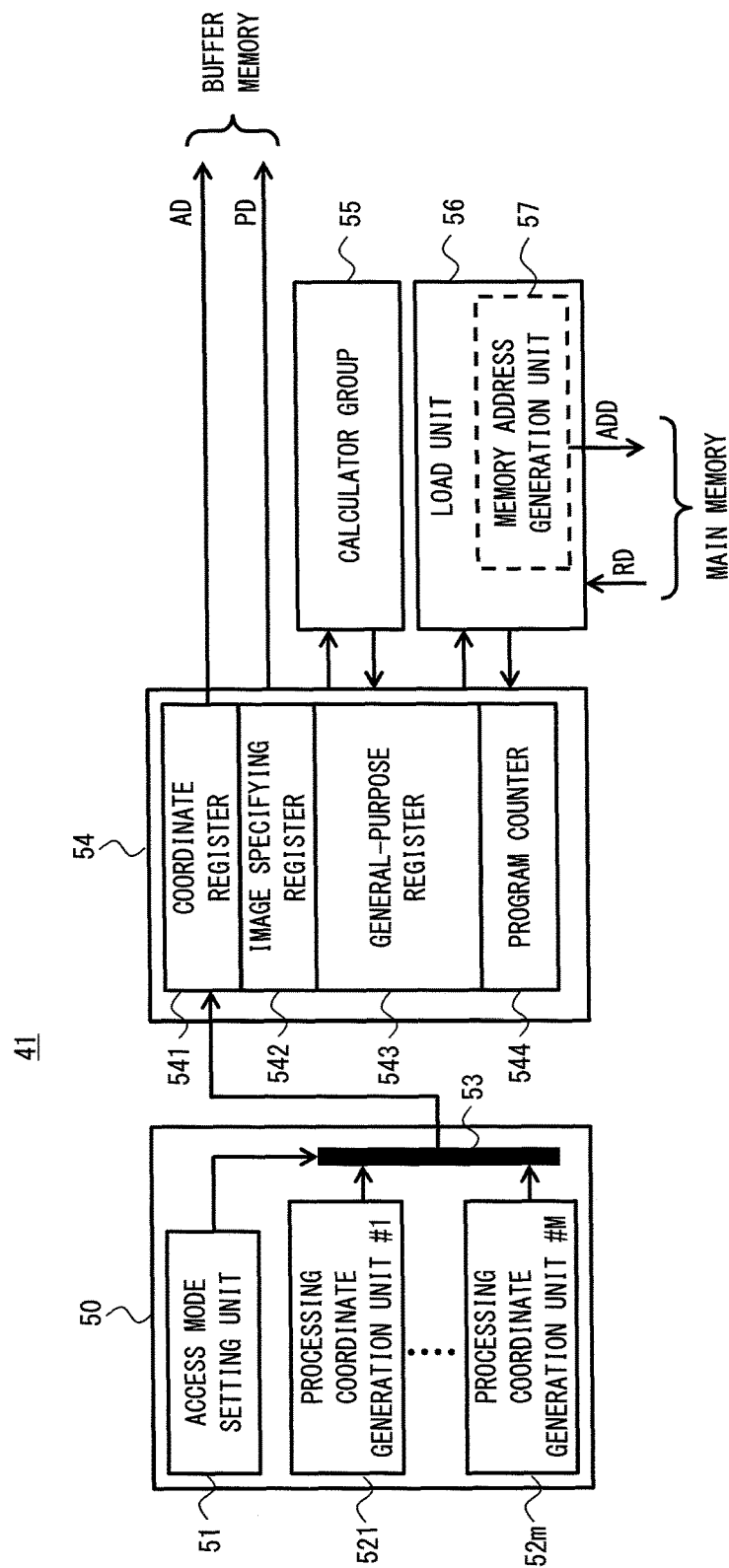
FIG. 3 is a block diagram of the load processor according to the first embodiment.

First, in FIG. 3, shown is a block diagram of the load processor 41 pertaining to the first embodiment. As shown in FIG. 3, the load processor 41 has: a coordinate generation unit 50; a register group 54; a calculator group 55; and a load unit 56.

(Explanation of coordinate generation unit 50)

The coordinate generation unit 50 generates coordinate information of pixel data to be read. More specifically, the coordinate generation unit 50 has an access mode setting unit 51, and mode correspondence coordinate generation units 521 to 52$m$ ($m$ is an integer indicating the number of mode correspondence coordinate generation units). The access mode setting unit 51 outputs a mode setting value to set an access mode. The mode correspondence coordinate generation units 521 to 52$m$ are provided corresponding to the access modes, and each of them generates coordinate information corresponding to any one of the access modes. A selector 63 selects and outputs any one of the coordinate information that the mode correspondence coordinate generation units 521 to 52$m$ have output based on the mode setting value.

(Explanation of Access Mode)

The access mode will be explained here. The load processor 41 switches read rules of pixel data based on the access mode. For example, a case will be explained where the load processor 41 has rules based on the following Expressions (1) to (4) as first to fourth access modes. It is to be noted that x and y in Expressions (1) to (4) are an x-coordinate and a y-coordinate of the image data, respectively.

$$(x,y) \leftarrow (sx+tx, sy+ty) \quad (1)$$

$$(x,y) \leftarrow (sx+dx1*tx+dx2, sy+dy1*ty+dy2) \quad (2)$$

$$(x,y) \leftarrow (listX[t], listY[t]) \quad (3)$$

$$(x,y) \leftarrow (0,0) \quad (4)$$

Expression (1) is a read rule of the first access mode. Pixel data included in a rectangular region is read for every pixel in the first access mode. It is to be noted that sx and sy in Expression (1) are coordinate values from which access to the image data is started. tx and ty are loop variables of a double loop, and can take values of 0 to lx−1 and 0 to ly−1, respectively. Namely, starting values of tx and ty are 0. The value of tx is then incremented for every load processing in one pixel data unit, and returns to 0 at the time of having reached lx1. In addition, ty is incremented according to tx having returned to 0 from lx−1. Increment processing of tx and ty is then repeated until ty reaches lx−1.

Expression (2) is a read rule of the second access mode. Pixel data included in the rectangular region is read for every pixel in the second access mode. Processing regarding sx, tx, sy, and ty in Expression (2) is the same as Expression (1). Meanwhile, Expression (2) has dx1, dx2, dy1, and dy2 in addition to sx, tx, sy, and ty. dx1, dx2, dy1, and dy2 are variables that indicate a slope of a rectangle. It is to be noted that if dx1, dx2, dy1, and dy2 are set as dx1=2, dx2=0, dy1=1, and dy2=0, a coordinate value in a state where pixels on an image have been thinned out can be output.

Expression (3) is a read rule of the third access mode. In the third access mode, pixel data is read in arbitrary order in accordance with a coordinate array specified by a user. listX[t] and listY[t] are coordinate arrays that the user gives.

Expression (4) is a read rule of the fourth access mode. It means that (0, 0) is always output in the fourth access mode. The fourth access mode is used in a case of changing an access point in accordance with image information.

(Explanation of Register Group)

The register group 54 has a plurality of registers to store data utilized by the calculator group 55 and the load unit 56. More specifically, the register group 54 has: a coordinate register 541; an image specifying register 542; a general-purpose register 543; and a program counter 544. The coordinate register 541 holds coordinate information given from the coordinate generation unit 50. The coordinate information stored in the coordinate register 541 is utilized by the calculator group 55 and the load unit 56. In addition, the coordinate information stored in the coordinate register 541 is output to the buffer circuit 42 as coordinate information AD. The image specifying register 542 holds an image specifying value to specify a number of an image to be processed. The general-purpose register 543 holds arbitrary data. The program counter 544 holds a program count value that indicates a number of an instruction in a program being executed by the load processor 41. It is to be noted that the plurality of coordinate generation units 50, coordinate registers 541, and image specifying registers 542 may be implemented. The plurality of coordinate generation units 50, coordinate registers 541, and image specifying registers 542 are implemented, and thereby access to the plurality of image data can be carried out using different access methods in a case of accessing a plurality of images, etc.

(Explanation of Calculator Group 55 and Load Unit 56)

The calculator group 55 performs calculations, such as four calculations and a branch instruction, using values arranged in the register group 54 in accordance with an instruction specified by the load program. The load unit 56 reads pixel data from image data stored in the main memory 11. This load unit 56 loads pixel data specified by the load program. In addition, the pixel data that the load unit 56 has read from the main memory 11 is, for example, output to the buffer circuit 42 as pixel data PD through the general-purpose register 543. Although a value of the coordinate register may be made to be automatically transmitted to a coordinate buffer, which will be mentioned later, or the user may explicitly transmit the value by an instruction etc., it is treated to be automatically transmitted at the time of updating of the coordinate register in the embodiment. In addition, the loaded pixel data is written by specifying an address of a data buffer, which will be mentioned later, etc.

Furthermore, the load unit 56 has a memory address generation unit 57 that generates a memory access address ADD based on coordinate information. The load unit 56 can generate the specific memory access address ADD based on the coordinate information of the pixel data by being provided with the memory address generation unit 57.

(Explanation of Program Description Regarding Load Processing of Load Program)

Here, will be explained program description regarding load processing of the load program. As description of load of data in the load program, for example, description can be conceived in which a relative coordinate (a, b) from the coordinate information set by the coordinate register 541 is specified to acquire pixel data. A program can be created more easily by specifying the pixel data to be read by means of the relative coordinate from the coordinate information stored in the coordinate register 541 for example, as compared with a case where the pixel data to be read is specified by means of a memory access address, or the pixel data to be read is specified by an absolute coordinate. Hereinafter, an example is shown where pixel data to be read is specified using the relative coordinate.

LDP R# . . . Instruction 1

LDR R#, a, b . . . Instruction 2

An LDP instruction and an LDR instruction are instruction codes. R# is an operand, and indicates a #_th general-purpose register. The LDP instruction is the instruction to read a coordinate value set by the coordinate register 541 from an image memory set by the image specifying register 542. According to the LDP instruction, when 1 is stored in the image specifying register 542, and (x, y) is stored in the coordinate register 541, pixel data of (x, y) of an image 1 can be read to a general-purpose register #. The LDR instruction is the instruction to access the image data using the relative coordinate (a, b). According to the LDR instruction, when 1 is stored in the image specifying register 542, and (x, y) is stored in the coordinate register 541, pixel data of an coordinate (x+a, y+b) of the image 1 can be read to the general-purpose register #.

As described above, in order to read data from a coordinate specified by the relative coordinate, needed is a mechanism to convert coordinate information into a memory access address. Therefore, the memory access address ADD is generated from the coordinate information using the memory address generation unit 57 in the load processor 41. Here, a block diagram of the memory address generation unit 57 is shown in FIG. 4.

(Explanation of Memory Address Generation Unit 57)

Figure 4:
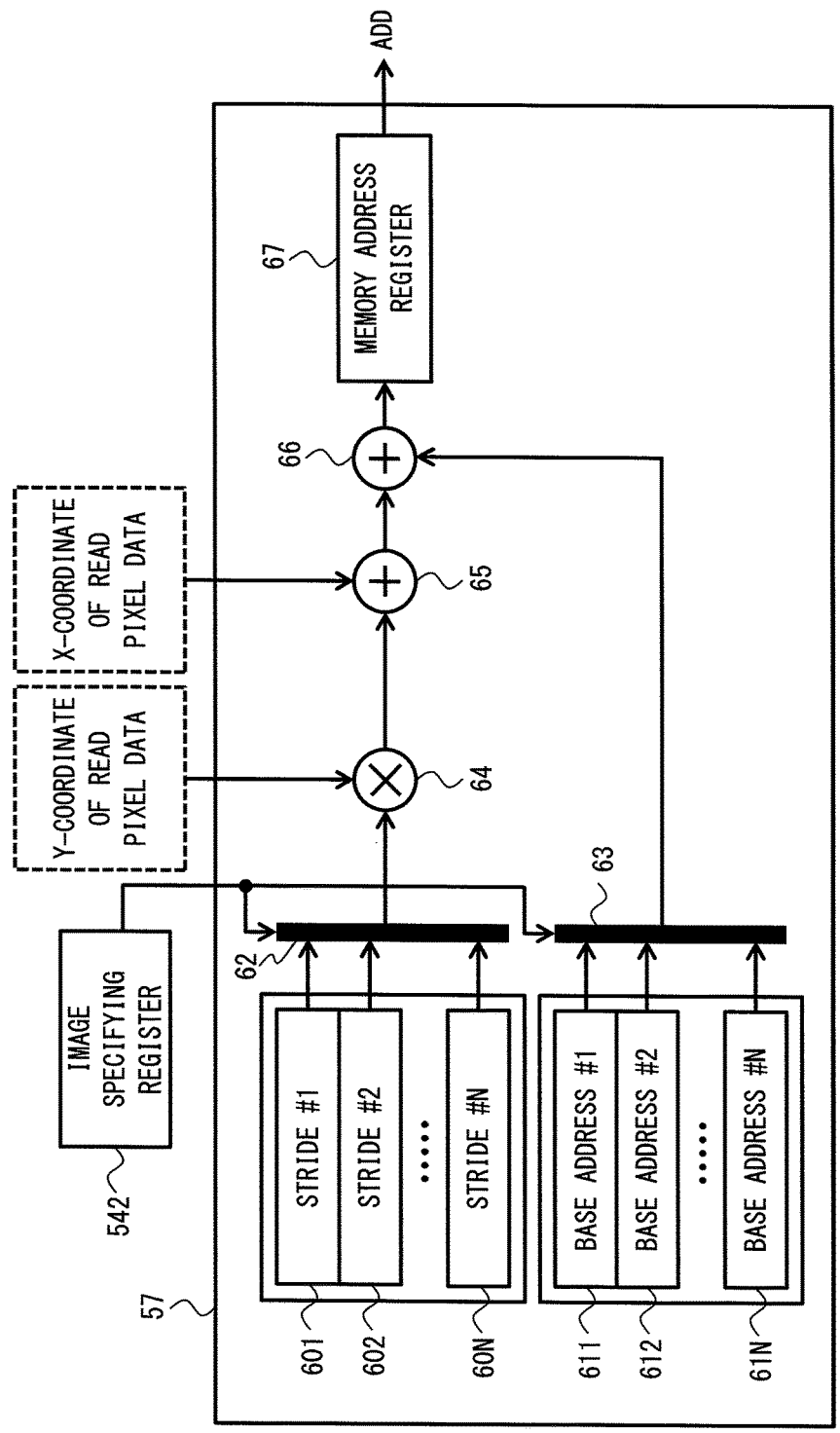
FIG. 4 is a block diagram of the memory address generation unit according to the first embodiment.

As shown in FIG. 4, the memory address generation unit 57 has: stride setting registers 601 to 60N (N is an integer indicating the number of types of corresponding image data); base address setting registers 611 to 61N; selectors 62 and 63; a multiplier 64; adders 65 and 66; and a memory address register 67.

A stride value that indicates a byte width of image data corresponding to each image number is previously stored in the stride setting registers 601 to 60N. An initial base address where an image has been stored is stored in the base address setting registers 611 to 61N.

The selector 62 selects any one of the stride setting registers 601 to 60N according to the image number stored in the image specifying register 542, and outputs the stride value stored in the selected stride setting register. The selector 63 selects any one of the base address setting registers 611 to 61N according to the image number stored in the image specifying register 542, and outputs the base address stored in the selected base address setting register.

The multiplier 64 outputs a value obtained by multiplying a value of a y-coordinate of pixel data to be read by a stride value thereof. The adder 65 outputs a value obtained by adding a value of an x-coordinate of the pixel data to be read to the multiplication value that the multiplier 64 has output. The adder 66 outputs a value obtained by adding a value of the base address to the additional value that the adder 65 has output, and stores it in the memory address register 67. The value stored in the memory address register 67 is output as the memory access address ADD.

Here, using a specific example, will be explained a procedure to convert coordinate information into a memory access address ADD. Here, as an example, will be explained a procedure to generate a memory access address ADD corresponding to pixel data in which the relative coordinate indicates (a, b) with respect to the coordinate information (x, y) stored in the coordinate register 541. In addition, the following explanation will be made assuming that the stride value is set as S, and that the base address as B.

In this case, a coordinate of pixel data is calculated as (x+a, y+b) on the load program. Therefore, an output value of the multiplier 64 indicates S*(y+b). Additionally, an output of the adder 65 indicates S*(y+b)+(x+a). Furthermore, an output of the adder 66 indicates S*(y+b)+(x+a)+B. That is, an eventual memory access address ADD indicates S*(y+b)+(x+a)+B.

It is to be noted that, to the memory address generation unit 57, may just be added a configuration that can perform such processing that when the number of bytes per pixel is not 1, multiplying the number of bytes by a, or a first value calculated by means of a byte/pixel is set for every image, and x+a given as coordinate information of the pixel data is multiplied by the first value, etc.

<Explanation of Buffer Circuit 42>

Figure 5:
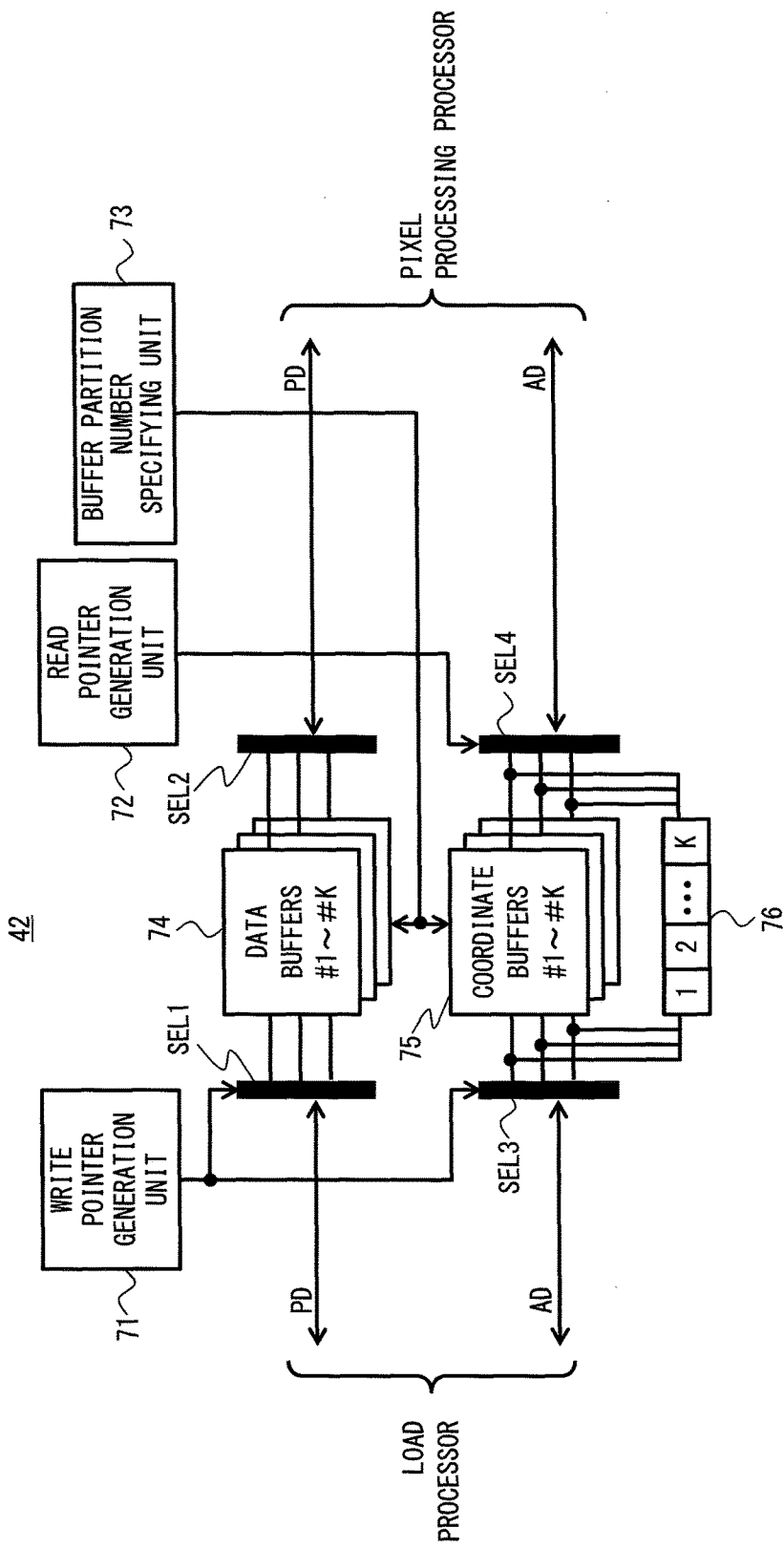
FIG. 5 is a block diagram of the buffer circuit according to the first embodiment.

Subsequently, the buffer circuit 42 will be explained in detail. A block diagram of the buffer circuit 42 is shown in FIG. 5. The buffer circuit has: a write pointer generation unit 71; a read pointer generation unit 72; a buffer partition number specifying unit 73; a buffer memory (for example, a data buffer 74); a coordinate buffer 75; a lock flag register 76; and selectors SEL1 to SEL4.

The pixel data PD is temporarily stored in the data buffer 74. In the coordinate buffer 75, temporarily stored is the coordinate information AD output from the load processor 41 together with the image data. A lock flag indicating a write permission state of the data buffer 74 is stored in the lock flag register 76. Additionally, the load processor 41 writes the pixel data PD in the data buffer 74 and makes the lock flag register into a write inhibit state, and the pixel processing processor 43 reads the pixel data PD from the data buffer 74 and makes the lock flag register into the write permission state.

Here, in an example shown in FIG. 5, the data buffer 74 and the coordinate buffer 75 are partitioned into a plurality of buffer memories. In addition, the lock flag register 76 holds at least the same number of lock flags as the partition number of the data buffer 74 and the coordinate buffer 75. Additionally, in order to utilize the plurality of buffer memories, the buffer circuit 42 has: the write pointer generation unit 71; the read pointer generation unit 72; and the buffer partition number specifying unit 73. The partition number of a storage region of the buffer memory is set by the buffer partition number specifying unit 73. It is to be noted that the partition number is indicated as K in FIG. 5.

The write pointer generation unit 71 outputs write pointers indicating the data buffer 74 to write in and the coordinate buffer 75 to write in among the plurality of data buffers 74 and coordinate buffers 75. The selector SEL1 gives the pixel data PD to the data buffer 74 indicated by the write pointer. The selector SEL2 gives the coordinate information AD to the coordinate buffer 75 indicated by the write pointer.

The read pointer generation unit 72 outputs read pointers indicating the data buffer 74 to read from and the coordinate buffer 75 to read from among the plurality of data buffers 74 and coordinate buffers 75. The selector SEL3 reads the pixel data PD from the data buffer 74 indicated by the read pointer, and gives it to the pixel processing processor 43. The selector SEL4 reads the coordinate information AD from the coordinate buffer 75 indicated by the read pointer, and gives it to the pixel processing processor 43.

Additionally, at the time of writing the pixel data PD in the data buffer 74 that the write pointer indicates, the load processor 41 makes into the write inhibit state the lock flag register 76 corresponding to the data buffer 74 that the read pointer indicates and increases a value of the write pointer. In addition, the coordinate information AD is written in the coordinate buffer 75 at the time of writing the pixel data PD in the data buffer 74. At the time of reading the pixel data PD from the data buffer 74 that the read pointer indicates, the pixel processing processor 43 makes into the write permission state the lock flag register 76 corresponding to the data buffer 74 that the read pointer indicates and increases a value of the read pointer. In addition, the pixel processing processor 43 reads the coordinate information AD from the coordinate buffer 75 at the time of reading the pixel data PD from the data buffer 74.

It is to be noted that the lock flag register 76 is in the write inhibit state if the lock flag is in an ON state, and that the lock flag register 76 is in the write permission state if the lock flag is in an OFF state. In addition, the lock flag register 76 is in a read permission state when the lock flag is in the ON state, and the lock flag register 76 is in a read inhibit state when the lock flag is the OFF state.

<Explanation of Pixel Processing Processor 43>

Figure 6:
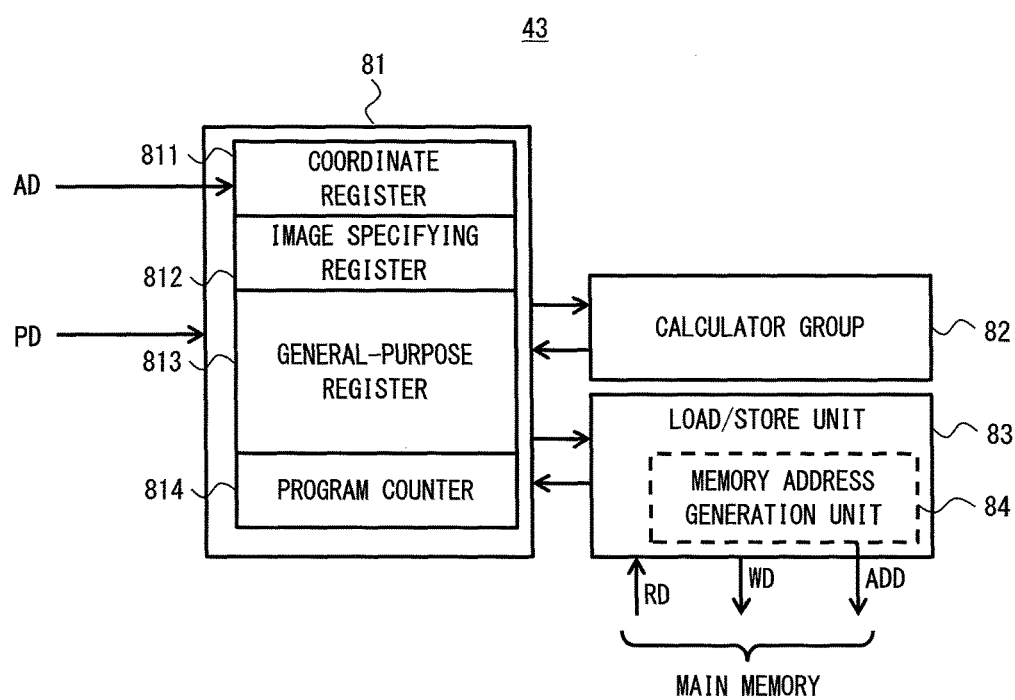
FIG. 6 is a block diagram of the pixel processing processor according to the first embodiment.

Subsequently, details of the pixel processing processor 43 will be explained. A block diagram of the pixel processing processor 43 is shown in FIG. 6. As shown in FIG. 6, the pixel processing processor 43 has: a register group 81; a calculator group 82; and a load/store unit 83.

(Explanation of Register Group 81)

The register group 81 has a plurality of registers to store data utilized by the calculator group 82 and the load/store unit 83.

More specifically, the register group 81 has: a coordinate register 811; an image specifying register 812; a general-purpose register 813; and a program counter 814. The coordinate register 811 holds the coordinate information AD read from the coordinate buffer 75 of the buffer circuit 42. Coordinate information stored in the coordinate register 811 is utilized by the calculator group 82 and the load/store unit 83. The image specifying register 812 holds an image specifying value to specify a number of an image to be processed. The general-purpose register 813 holds arbitrary data including the pixel data PD. The program counter 814 holds a program count value that indicates a number of an instruction in a program being executed by the pixel processing processor 43. It is to be noted that the plurality of coordinate registers 811 and image specifying registers 812 may be implemented. The plurality of coordinate registers 811 and image specifying registers 812 are implemented, and thereby access to the plurality of image data can be carried out using different access methods in a case of accessing a plurality of images, etc.

(Explanation of Calculator Group 82 and Load/Store Unit 83)

The calculator group 82 performs calculation, such as product-sum calculation, histogram processing, size determination, a branch instruction, using values arranged in the register group 81 in accordance with an instruction specified by the pixel processing program. Specific processing in the calculator group 82 is specified by the pixel processing program. The load/store unit 83 reads the pixel processing program from the main memory 11, and stores processed pixel data in the main memory 11. In addition, similarly to the load processor 56, it is efficient that the load/store unit 83 also specifies the memory access address ADD by means of a relative coordinate from the value stored in the coordinate register 811. Therefore, the load/store unit 83 has a memory address generation unit 84 having a similar mechanism to the memory address generation unit 57.

The pixel processing processor 43 recognizes which point of the main memory 11 data processed by the pixel processing processor 43 itself should be stored in by taking over the coordinate information AD from the load processor 41. This utilizes a property that usually in image processing, a coordinate of an output image is recognized if the coordinate information AD of an input image is recognized. However, this shall not be applied to the histogram processing etc. since an address of an output destination is decided by a processing result.

<Explanation of Access to Buffer Circuit 42>

Here, there will be explained a processing relationship of the load processor 41, the buffer circuit 42, and the pixel processing processor 43. First, in FIG. 7, shown is a flow chart showing an operation procedure of the load processor 41 in a case of writing pixel data in the buffer circuit 42.

Figure 7:
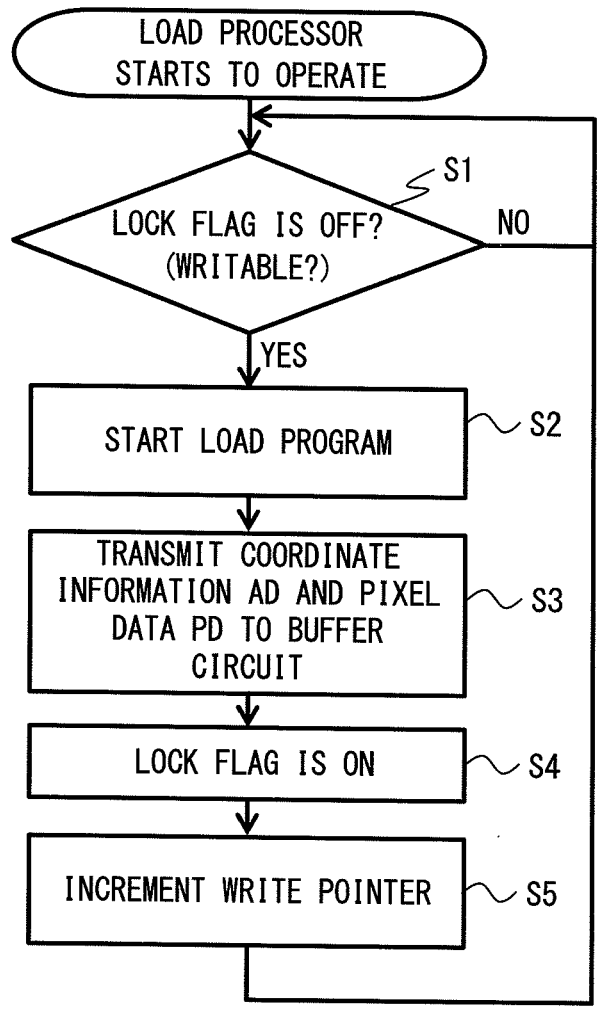
FIG. 7 is a flow chart showing an operation procedure of the load processor in a case of writing pixel data in the buffer circuit according to the first embodiment.

As shown in FIG. 7, when starting operation to the buffer circuit 42, the load processor 41 first confirms whether or not a lock flag is in an OFF state (step S1). If the lock flag is in the OFF state in this step S1 (a NO branch in step S1), the load processor 41 does not perform write processing to the buffer circuit 42. Meanwhile, if the lock flag is in an ON state in step S1 (a YES branch in step S1), the load processor 41 starts the load program (step S2). Next, the load processor 41 transmits the loaded pixel data PD and coordinate information AD to the buffer circuit 42 (step S3). Next, the load processor 41 rewrites the lock flag from the OFF state to the ON state (step S4). In addition, the load processor 41 increases a write pointer (step S5). When completing processing of steps S1 to S5, the load processor 41 then restores a processing state to step S1.

Figure 8:
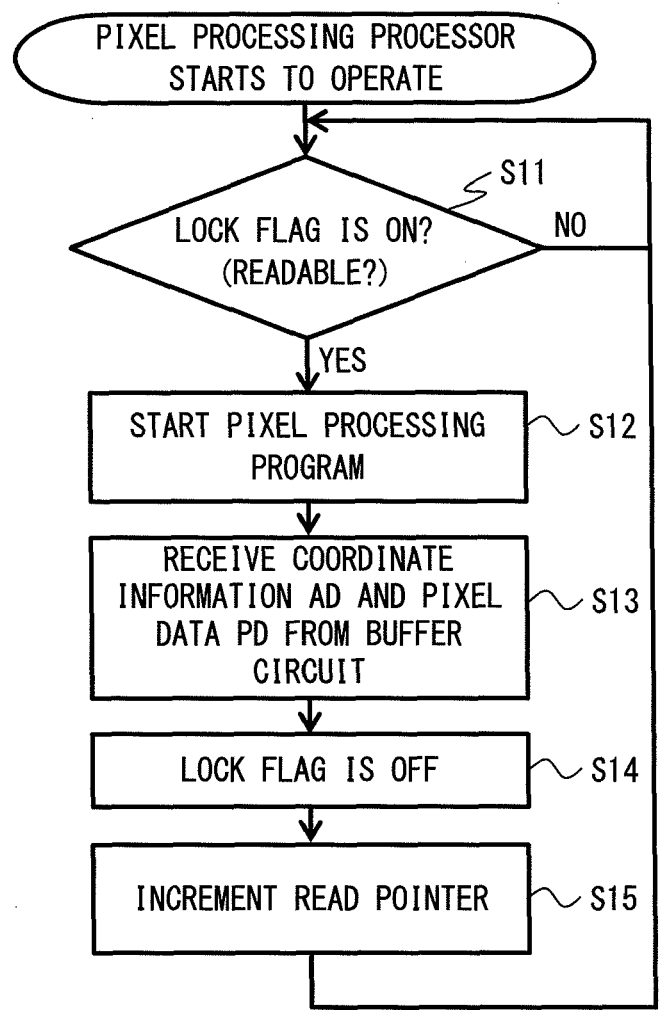
FIG. 8 is a flow chart showing an operation procedure of the pixel processing processor in a case of reading pixel data from the buffer circuit according to the first embodiment.

In FIG. 8, shown is a flow chart showing an operation procedure of the pixel processing processor 43 in a case of reading pixel data from the buffer circuit 42. As shown in FIG. 8, when starting operation to the buffer circuit 42, the pixel processing processor 43 first confirms whether or not the lock flag is in the ON state (step S11). If the lock flag is in the ON state in this step S11 (a NO branch in step S11), the pixel processing processor 43 does not perform read processing to the buffer circuit 42. Meanwhile, if the lock flag is in the OFF state in step S11 (a YES branch in step S11), the pixel processing processor 43 starts the pixel processing program (step S12). Next, the pixel processing processor 43 receives the pixel data PD and the coordinate information AD from the buffer circuit 42 (step S13). Next, the pixel processing processor 43 rewrites the lock flag from the ON state to the OFF state (step S14). In addition, the pixel processing processor 43 increases a read pointer (step S15). When completing processing of steps S11 to S15, the pixel processing processor 43 then restores a processing state to step S11.

<Explanation of Operation of Image Processing Apparatus>

Figure 9:
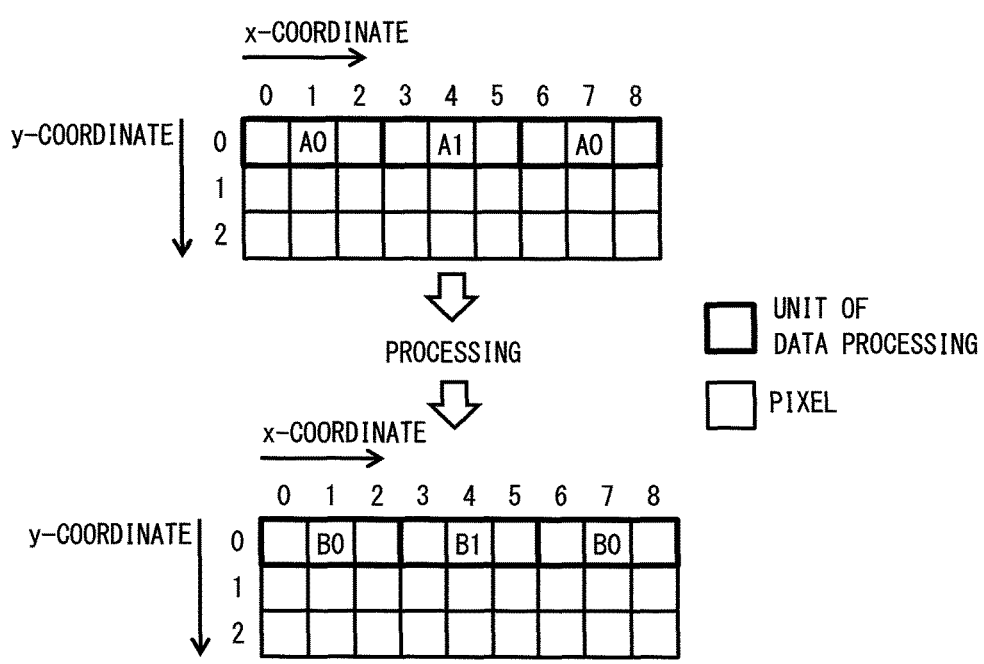
FIG. 9 is a schematic diagram showing a content of processing of a first operation example of the image processing apparatus according to the first embodiment.

Subsequently, there will be explained operation of the image processing apparatus 1 pertaining to the first embodiment. Hereinafter, there will be explained the operation of the image processing apparatus 1 pertaining to the first embodiment with two operation examples. Therefore, in FIG. 9, shown is a schematic diagram showing a content of processing of a first operation example of the image processing apparatus 1 pertaining to the first embodiment. As shown in FIG. 9, in the first operation example, pixel data is read from a first image in three pixel units, and the pixel data is written in a second image after certain processing is added to the pixel data.

Here, the certain processing can be conceived to be, for example, color space conversion etc. Processing that generates a brightness value Y from an RGB color space can be achieved by Expression (5). Such processing is called data processing, and a content of processing of the pixel processing program is described.

$$Y = 0.299R + 0.587G + 0.114B \qquad (5)$$

Figure 10:
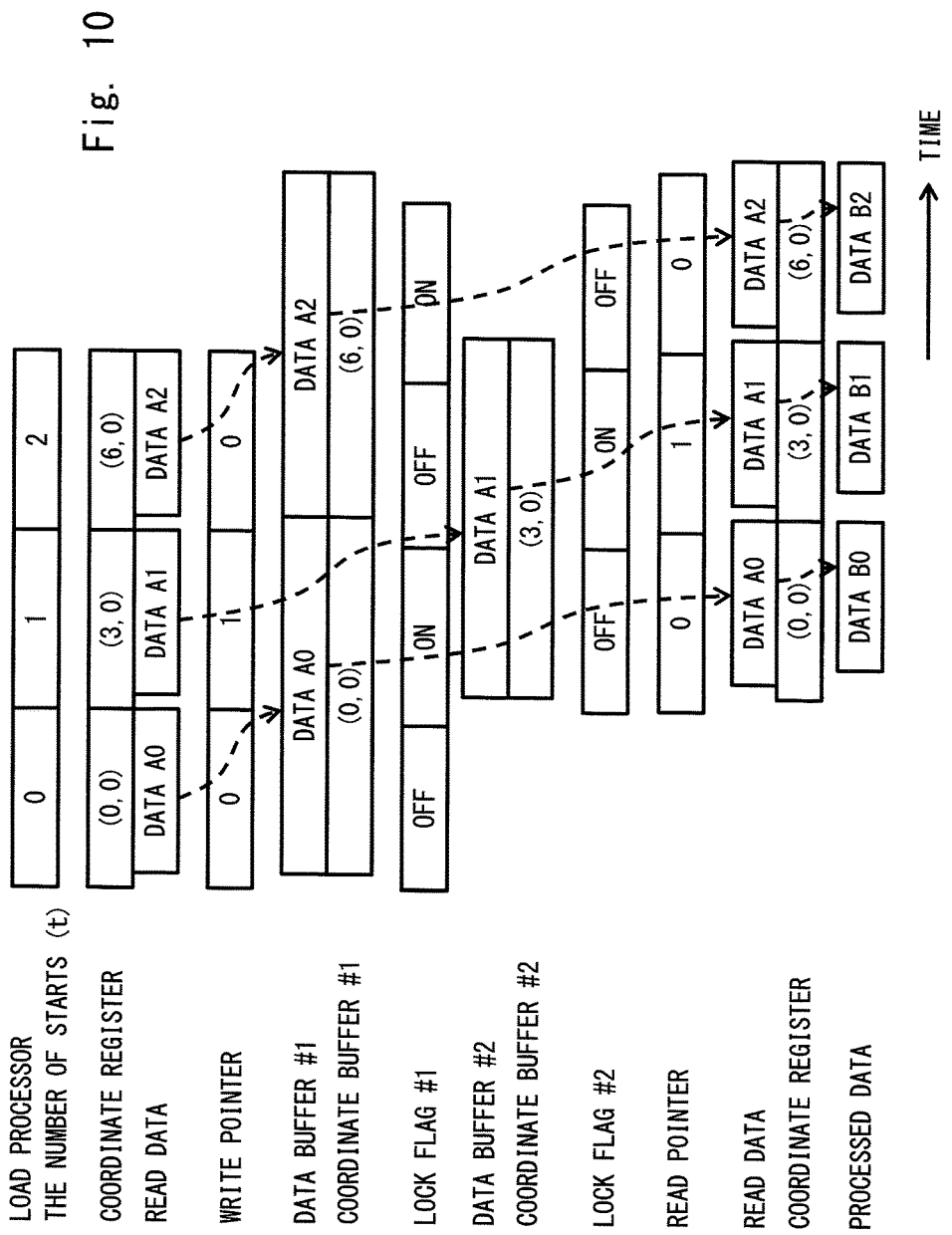
FIG. 10 is a timing chart showing operation of the image processing apparatus according to the first embodiment in a case of performing processing shown in FIG. 9.

Next, in FIG. 10, shown is a timing chart showing operation of the image processing apparatus 1 pertaining to the first embodiment in a case of performing processing shown in FIG. 9. First, when the image processing apparatus 1 performs operation as shown in FIG. 9, the load program executed by the load processor 41 sets the access mode as a second access mode in which read coordinate information of the pixel data is generated based on Expression (2). Additionally, the load program sets sx=0, sy=0, dx1=3, dy1=1, dx2=0, dy2=0, lx=9, and ly=2. As a result of this, coordinate information that skips for every three pixels in an x direction is generated in the load processor 41.

In addition, a value set by the buffer partition number specifying unit 73 is assumed to be 2 in the first operation example shown in FIG. 10. Namely, the data buffer 74 and the coordinate buffer 75 are partitioned into two. The write pointer and the read pointer respectively indicate 0 when pointing a first buffer, and they indicate 1 when pointing a second buffer. Values of the write pointer and the read pointer returns 0 when incremented in a state where the values are 1. Namely, the write pointer and the read pointer alternately take 0 and 1 whenever the values thereof are incremented. It is to be noted that 1, which is a number of an image of a read source, is set as an image number in the image specifying register 512 of the load processor 41, and that 2, which is a number of an image of a write destination, is set as an image number in the image specifying register 812 of the pixel processing processor 43.

As shown in FIG. 10, in the image processing apparatus 1 pertaining to the first embodiment, the load processor 41 reads one pixel data unit whenever starting the load program. At this time, the load processor 41 reads pixel data units (data A0 to A2 in the example shown in FIG. 9) located at coordinates in which the x-coordinate increases three by three.

Additionally, when the write pointer is 0, the load processor 41 writes read image data and coordinate information of the image data in the first data buffer 74 and coordinate buffer 75. In addition, when the write pointer is 1, the load processor 41 writes read image data and coordinate information of the image data in the second data buffer 74 and coordinate buffer 75. Since the load processor 41 increments the write pointer by one whenever performing write processing, the data A0 and A2 are written in the first data buffer 74 and coordinate buffer 75, and the data A1 is written in the second data buffer 74 and coordinate buffer 75. In addition, whenever writing pixel data in the data buffer 74, the load processor 41 makes the lock flag transition from the OFF state to the ON state.

When the read pointer is 0, the pixel processing processor 43 reads the image data and the coordinate information of the image data from the first data buffer 74 and coordinate buffer 75. In addition, when the write pointer is 1, the pixel processing processor 43 reads the image data and the coordinate information of the image data from the second data buffer 74 and coordinate buffer 75. Since the pixel processing processor 43 increments the read pointer by one whenever performing read processing, the data A0 to A2 are sequentially read. In addition, whenever reading pixel data, the pixel processing processor 43 makes the lock flag associated with the data buffer 74 to read from transition from the ON state to the OFF state.

Additionally, the pixel processing processor 43 applies image processing to the read data A0 to A2, and generates data B0 to B2. The pixel processing processor 43 then writes the data B0 to B2 in coordinates of the second image corresponding to the coordinate information of the data A0 to A2.

Figure 11:
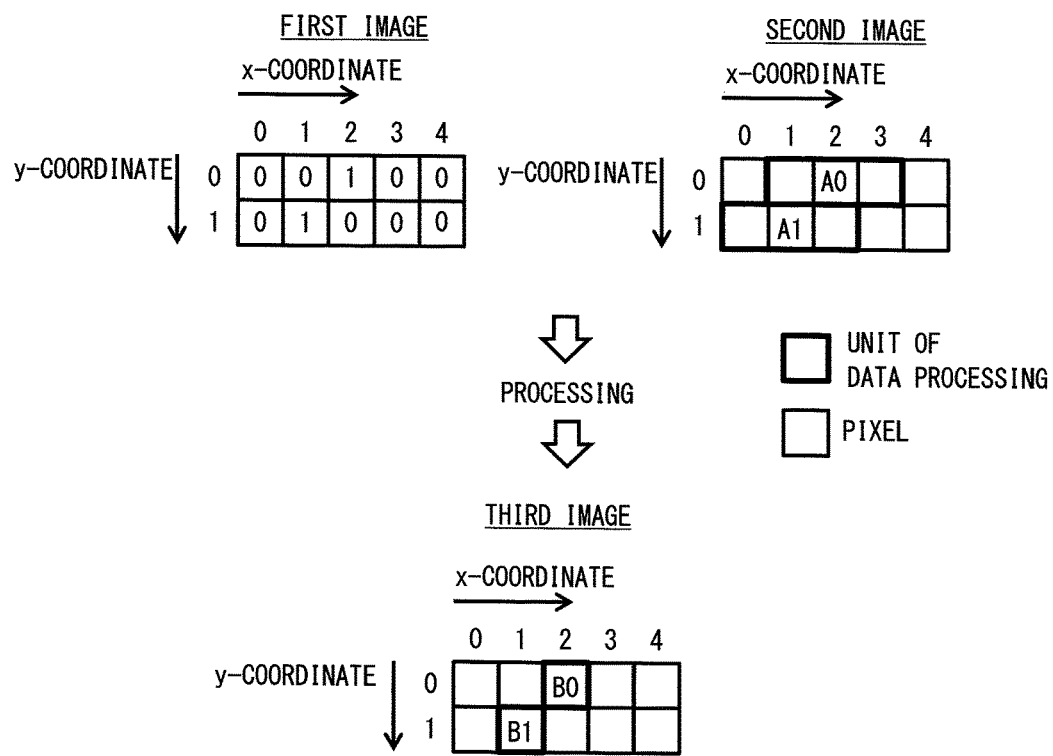
FIG. 11 is a schematic diagram showing a content of processing of the second operation example of the image processing apparatus according to the first embodiment.

Subsequently, a second operation example will be explained. Therefore, in FIG. 11, shown is a schematic diagram showing a content of processing of the second operation example of the image processing apparatus 1 pertaining to the first embodiment. As shown in FIG. 11, in the second operation example, pixel data of the first image is read pixel by pixel, nothing is done if a value of the read pixel data is 0, and a total of three pixel data is read if the value of the pixel data is 1, the three pixel data including a pixel of the same coordinate of the second image and pixels on both sides of the pixel. Additionally, in the second operation example, image processing (for example, mean value processing) is applied to the pixel data read from the second image, and the processed image data is written in a coordinate in a third image corresponding to a coordinate of a pixel whose value is determined to be 1 in the first image. That is, in the second operation example, there exist the first image with flag information and the second image corresponding thereto, and such processing is performed that predetermined processing is performed if the flag information is 1, and that nothing is done if the flag information is 0. In the example shown in FIG. 11, flags are set on coordinates (2, 0) and (1, 1). Therefore, three pixel data centering on the coordinate (2, 0) of the second image is read as the data A0, and three pixel data centering on the coordinate (1, 1) of the second image is read as the data A1. In addition, the data B0 into which the data A0 has been processed is written in the coordinate (2, 0) of the third image, and the data B1 into which the data A1 has been processed is written in the coordinate (1, 1) of the third image.

Figure 12:
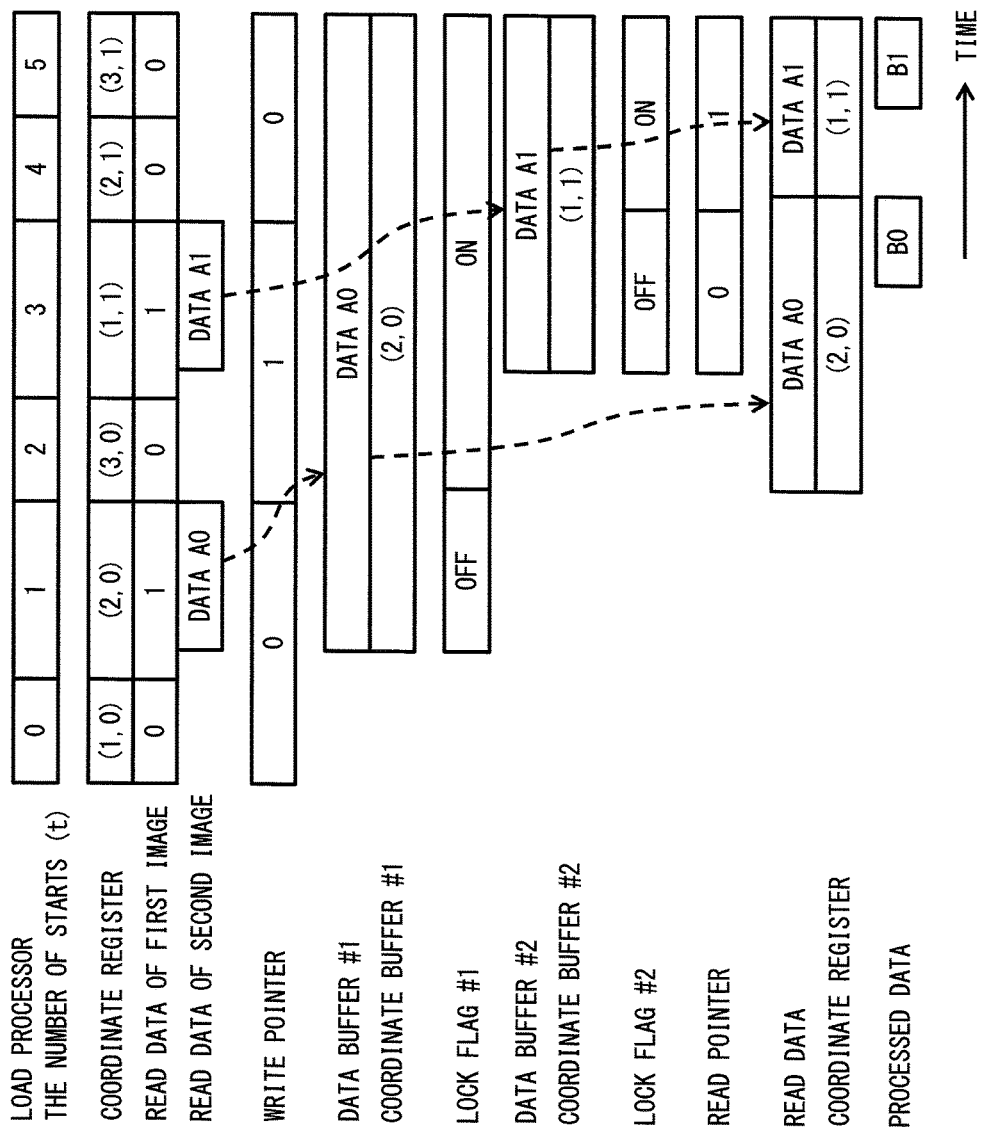
FIG. 12 is a timing chart showing operation of the image processing apparatus according to the first embodiment in a case of performing operation of the second operation example shown in FIG. 11.

In FIG. 12, shown is a timing chart showing operation of the image processing apparatus 1 pertaining to the first embodiment in a case of performing operation of the second operation example shown in FIG. 11. In this second operation example, the load processor 41 scans all pixels based on the first access mode expressed by Expression (1).
Parameters of Expression (1) are sx=1, sy=0, lx=3, and ly=2. In addition, the buffer partition specifying number K is set to be 2. In addition, since the number of starts t of the load processor 41 is given as 0 to 5, (1, 0), (2, 0), (3, 0), (1, 1), (2, 1), and (3, 1) are sequentially given as coordinate information given to the coordinate register 541 in accordance with a coordinate generation method of a skip scan.

As shown in FIG. 12, in the second operation example, the load processor 41 reads the data A0 and A1 including data of corresponding coordinates of the second image according to the pixel data of the first image whose value is 1 having been read. The load processor 41 then stores the data A0 and A1 in the data buffer 75 indicated by the write pointers. In addition, the load processor 41 stores coordinate information corresponding to the data A0 and A1 in the coordinate buffer 75 indicated by the write pointers.

Additionally, the pixel processing processor 43 reads data from the data buffer 74 that the read pointer indicates and reads coordinate information from the coordinate buffer 75 according to the lock flag having been in the ON state. After that, the pixel processing processor 43 applies processing to the read data A0 and A1, and generates the data B0 and B1. In addition, the pixel processing processor 43 writes the generated data B0 and B1 in the coordinates of the third image indicated by the coordinate information acquired together with the data A0 and A1.

<Effects of Image Processing Apparatus 1 Pertaining to First Embodiment>

According to the above explanation, in the image processing apparatus 1 pertaining to the first embodiment, separately provided are the load processor 41 that reads pixel data from the main memory 11, and the pixel processing processor 43 that applies image processing to the pixel data and writes the processed pixel data back to the main memory 11. In addition, the load processor 41 is made to operate based on the load program, and the pixel processing processor 43 is made to operate based on the pixel processing program. As a result of this, in the image processing apparatus 1 pertaining to the first embodiment, a circuit scale can be reduced while flexibility of processing is enhanced.

More specifically, in the image processing apparatus 1 pertaining to the first embodiment, the load processor 41 specialized in load processing, and the pixel processing processor 43 specialized in image processing and store processing are separately provided, and thereby the circuit scale can be reduced. In addition, the load processor 41 is made to operate based on the load program, and thereby flexibility of memory access can be enhanced. In addition, the pixel processing processor 43 is made to operate by the pixel processing program, and thereby flexibility of image processing can be enhanced.

In addition, since the image processing apparatus 1 pertaining to the first embodiment can make the load processor 41 and the pixel processing processor 43 operate in parallel, high processing capability can be achieved. Furthermore, since data transfer of the load processor 41 and the pixel processing processor 43 is performed through the buffer circuit 42 in the image processing apparatus 1, independency of processing of the load processor 41 and processing of the pixel processing processor 43 can be enhanced. As a result of this, the image processing apparatus 1 can achieve higher processing capability.

(Comparative Example)

Figure 13:
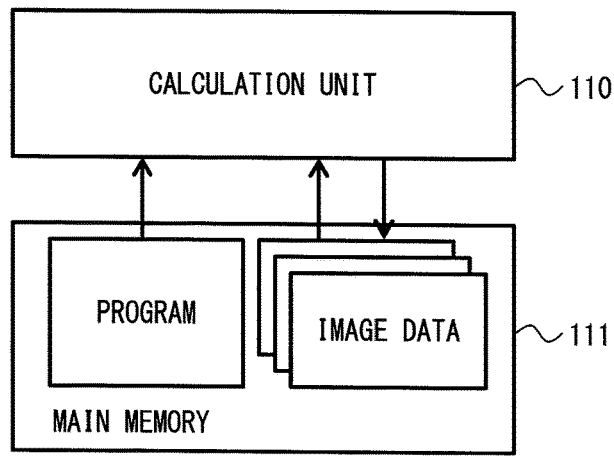
FIG. 13 is a block diagram of an image processing apparatus of a first comparative example.
Figure 14:
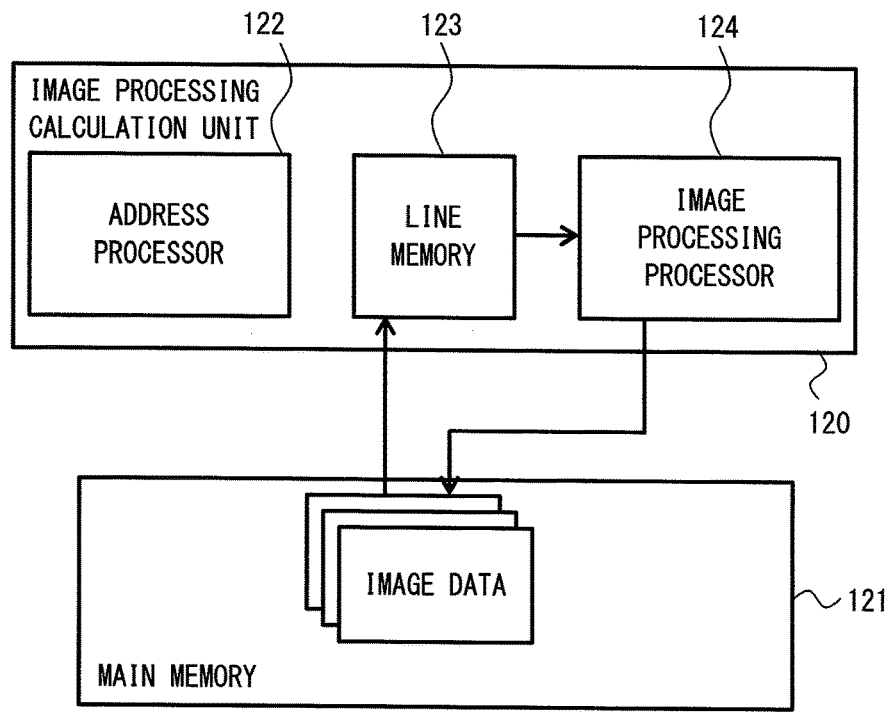
FIG. 14 is a block diagram of an image processing apparatus of a second comparative example.
Figure 15:
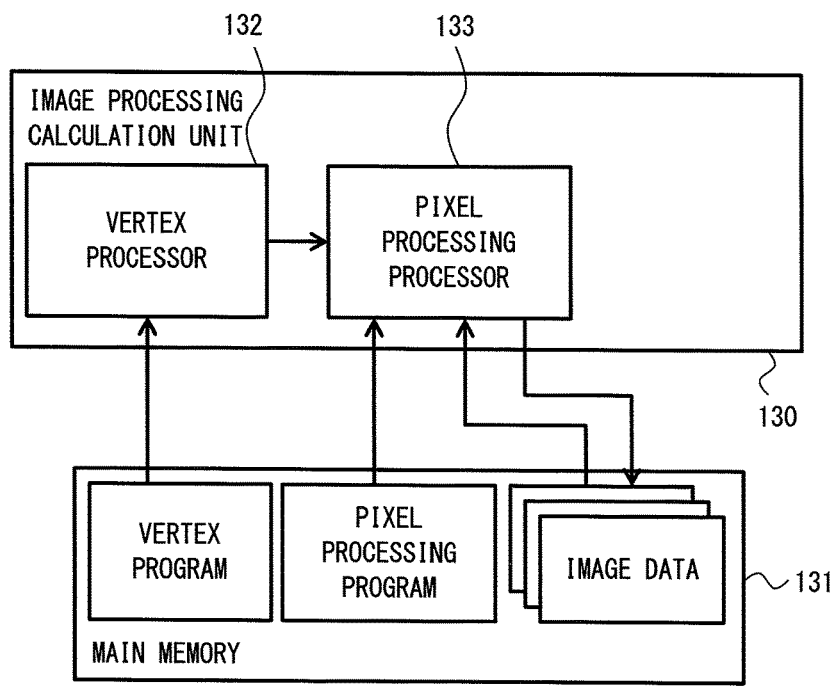
FIG. 15 is a block diagram of an image processing apparatus of a third comparative example.

Here, in order to further explain the above-described effects, will be explained a configuration and problems in an image processing apparatus utilized for image processing. Here, in order to further explain the above-described effects, will be explained a comparative example that the inventors have examined. In FIGS. 13 to 15, shown are block diagrams of an image processing apparatus of the comparative example.

The image processing apparatus 101 shown in FIG. 13 has: a calculation unit 110 that can execute general-purpose calculation; and a main memory 111 to store a program and image data. This image processing apparatus 101 makes the calculation unit 110 operate based on the program stored in the main memory 111. In addition, the calculation unit 110 processes image data in accordance with the program.

Although the image processing apparatus 101 can execute various image processing based on the program, it has a problem of having a large circuit scale in order to maintain flexibility. In addition, the image processing apparatus 101 has a problem that since the calculation unit 110 has to perform execution of the program and read and write of data, an amount of data throughput decreases, and processing performance becomes insufficient.

An image processing apparatus 102 shown in FIG. 14 has an image processing calculation unit 120 and a main memory 121. The image processing calculation unit 120 has: an address processor 122; a line memory 123; and an image processing processor 124. In addition, image data is stored on the main memory 121.

In the image processing apparatus 102, the address processor 122 generates an address by a prescribed scheme and loads data in the line memory 123, and the image processing processor 124 processes the data. Since each block performs processing specializing in a fixed function in the image processing apparatus 102, high processing capability can be achieved with a small circuit area. However, there is a problem that since the function of each block is fixed in the image processing apparatus 102, flexibility of processing is low. When the flexibility is given to the each block, there is a problem that the circuit scale becomes larger, and that a processing delay due to a circuit etc. required for further achieving a plurality of functions occurs.

An image processing apparatus 103 shown in FIG. 15 has an image processing calculation unit 130 and a main memory 131. The image processing calculation unit 130 has a vertex processor 132 and a pixel processing processor 133. In addition, a vertex program, a pixel processing program, and image data are stored in the main memory 131.

In the image processing apparatus 103, the vertex processor decides a read range in the image data by vertex processing to calculate it, and the pixel processing processor performs read and write processing and image processing of the image data. In this image processing apparatus 103, the vertex processor 132 and the pixel processing processor 133 are configured as hardware specialized in the respective processing, and thus the circuit scale is small. However, there is a problem in the image processing apparatus 103 that since vertex processing unnecessary for image recognition processing is needed, and wasteful processing is performed, processing performance becomes insufficient when image recognition processing etc. are performed. In addition, there is a problem that when the vertex processor 132 and the pixel processing processor 133 are integrally formed, the circuit scale increases.

As described above, in the image processing apparatus pertaining to the comparative example, there occurs a problem in any of the circuit scale, processing capability, and flexibility of processing. However, any problem of the circuit scale, processing capability, and flexibility of processing can be solved by using the image processing apparatus 1 pertaining to the first embodiment.

<Second Embodiment>

Figure 16:
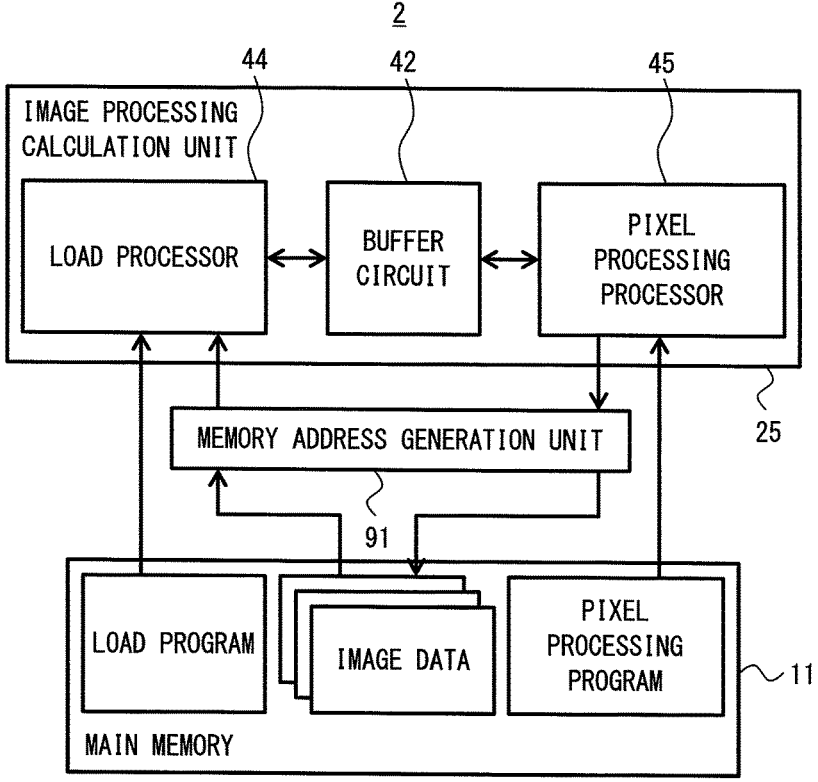
FIG. 16 is a block diagram of an image processing apparatus according to a second embodiment.

In a second embodiment, will be explained a modification example of the image processing apparatus 1 pertaining to the first embodiment. Therefore, in FIG. 16, shown is a block diagram of an image processing apparatus 2 pertaining to the second embodiment. As shown in FIG. 16, in the image processing apparatus 2 pertaining to the second embodiment, the memory address generation units incorporated in the load unit 56 and the load/store unit 83 of the image processing apparatus 1 pertaining to the first embodiment are standardized to thereby configure a memory address generation unit 91. Therefore, in the second embodiment, a load processor 44 is shown as the load processor 41 not having the load unit 56, and a pixel processing processor 45 is shown as the pixel processing processor 43 not having the memory address generation unit 84.

In an example shown in FIG. 16, the memory address generation unit 91 is located outside the image processing calculation unit 25, and is provided at a position including a path through which the load processor 44 accesses image data, and a path through which the pixel processing processor 45 accesses the image data.

As described above, the standardized common function is provided, and thereby the circuit scale of the image processing apparatus 2 pertaining to the second embodiment can be made smaller than that of the image processing apparatus 1 pertaining to the first embodiment.

<Third Embodiment>

Figure 17:
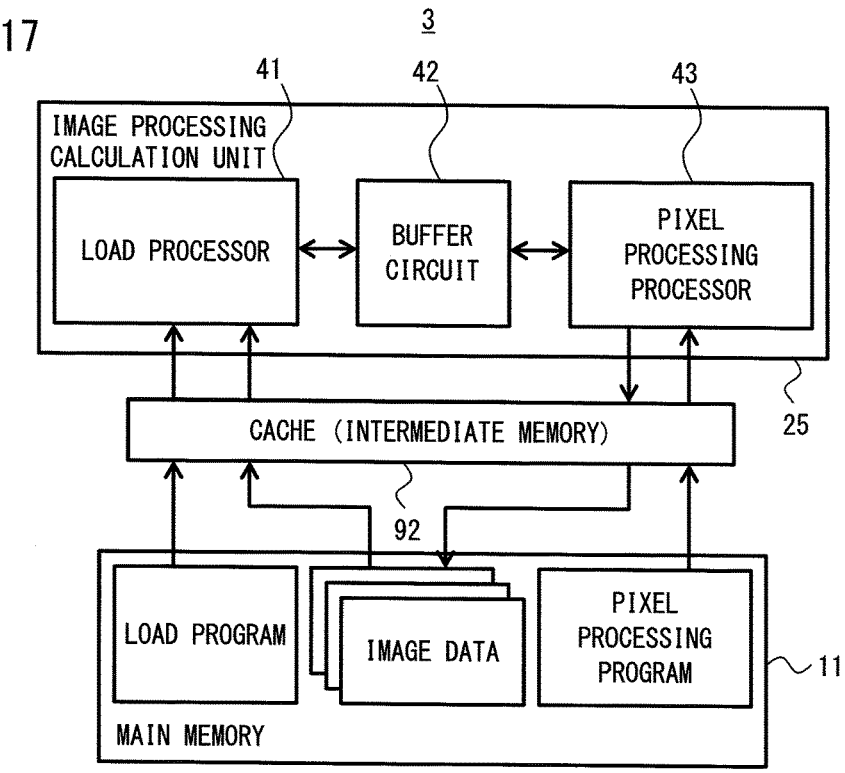
FIG. 17 is a block diagram of an image processing apparatus according to a third embodiment.

In a third embodiment, will be explained a modification example of the image processing apparatus 1 pertaining to the first embodiment. Therefore, in FIG. 17, shown is a block diagram of an image processing apparatus 3 pertaining to the third embodiment. As shown in FIG. 17, in the image processing apparatus 3 pertaining to the third embodiment, a cache 92 that functions as an intermediate memory is provided between the image processing calculation unit 25 and the main memory 11 of the image processing apparatus 1 pertaining to the first embodiment.

As described above, the cache 92 is provided between the image processing calculation unit 25 and the main memory 11, and thereby an access time regarding data with high access frequency can be reduced.

<Fourth Embodiment>

Figure 18:
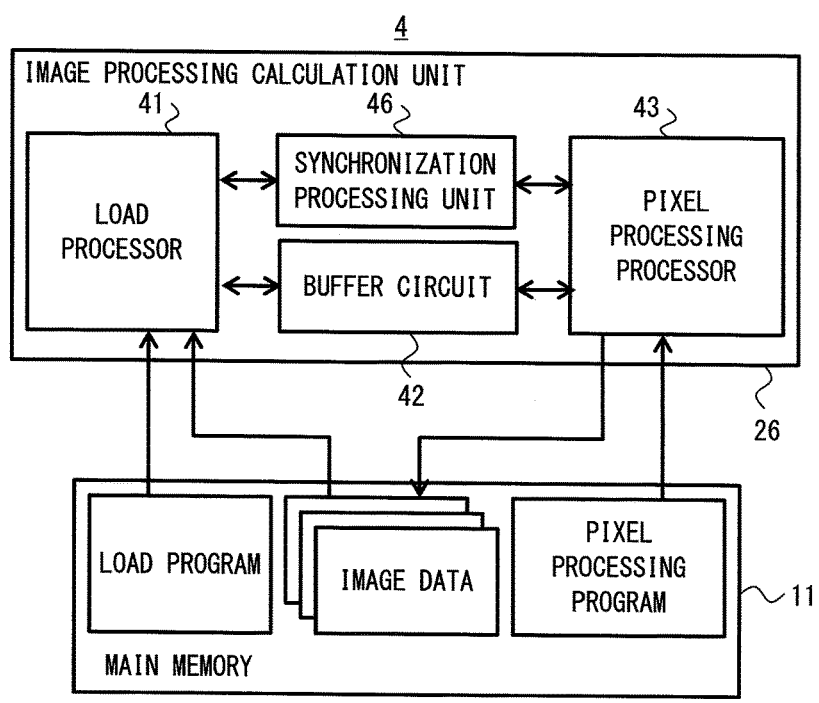
FIG. 18 is a block diagram of an image processing apparatus according to a fourth embodiment.

In a fourth embodiment, will be explained a modification example of the image processing apparatus 1 pertaining to the first embodiment. Therefore, in FIG. 18, shown is a block diagram of an image processing apparatus 4 pertaining to the fourth embodiment. As shown in FIG. 18, the image processing apparatus 4 has an image processing calculation unit 26 in which a synchronization processing unit 46 has been added to the image processing calculation unit 25 pertaining to the first embodiment.

The synchronization processing unit 46 is provided between the load processor 41 and the pixel processing processor 43, and outputs a wait signal to stop processing of one processor based on an instruction from the other processor, and a synchronization signal to instruct processing according to a processing result of one processor to the other processor. It is to be noted that the synchronization processing unit 46 may also be configured to output only either of the wait signal and the synchronization signal.

The synchronization processing unit 46 is provided, and thereby, for example, processing can be performed in which the load processor 41 changes a load position of pixel data in response to a processing result of the pixel processing processor 43. When such processing is performed, the load processor 41 needs to wait for operation of the pixel processing processor 43, and thus the synchronization processing unit 46 outputs the wait signal to the load processor 41. In addition, the synchronization signal is used in order to instruct the load processor 41 to refer to the processing result of the pixel processing processor 43.

In implementation, the partition number K of the buffer memory (for example, the data buffer 74 and the coordinate buffer 75) is set to be 1, and by a user's authority, separated are a region where the load processor 41 sends pixel data to the pixel processing processor 43, and a region where the pixel processing processor 43 sends the pixel data to the load processor 41. Next, if the lock flag is in the OFF state, the load processor 41 is permitted to perform read and write, and if the lock flag is in the ON state, the pixel processing processor 43 is permitted to perform read and write. As described above, sequential operation can be achieved by providing the synchronization processing unit 46.

According to the above explanation, the image processing apparatus 4 pertaining to the fourth embodiment is used, and thereby processing having flexibility higher than the image processing apparatus 1 pertaining to the first embodiment can be achieved. In addition, since access of the load processor 41 and the pixel processing processor 43 to the buffer circuit 42 is bidirectionally performed, and thereby both pixel data can be referenced without the main memory 11, in the image processing apparatus 4, processing capability can be more enhanced as compared with a case of performing similar processing using the image processing apparatus 1.

<Fifth Embodiment>

Figure 19:
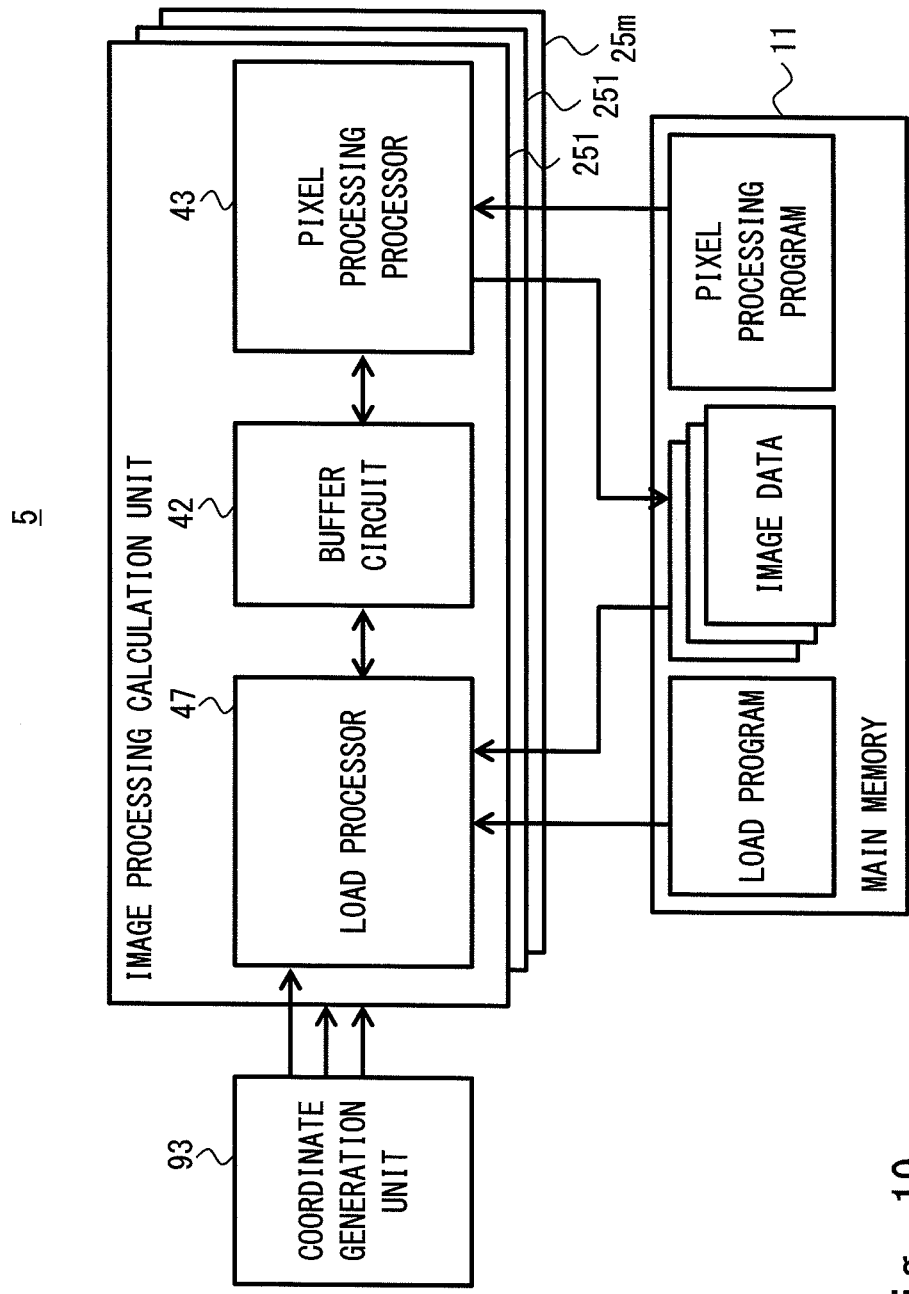
FIG. 19 is a block diagram of an image processing apparatus according to a fifth embodiment.

In a fifth embodiment, will be explained a modification example of the image processing apparatus 1 pertaining to the first embodiment. Therefore, in FIG. 19, shown is a block diagram of an image processing apparatus 5 pertaining to the fifth embodiment. As shown in FIG. 19, the image processing apparatus 5 pertaining to the fifth embodiment has a plurality of image processing calculation units (for example, image processing calculation units 251 to 25$m$) each of which includes the load processor 41, the buffer circuit 42, and the pixel processing processor 43.

In addition, in the image processing apparatus 5 pertaining to the fifth embodiment, the coordinate generation units 50 of the load processors 41 of the image processing calculation units 251 to 25$m$ are standardized to be provided as a coordinate generation unit 93. In addition, in FIG. 19, a symbol of a load processor in which the coordinate generation unit 50 has been eliminated from the load processor 41 is set as 47. That is, one coordinate generation unit 93 is provided with respect to the image processing calculation units 251 to 25$m$, and gives coordinate information to the load processors 47 of the image processing calculation units 251 to 25$m$, respectively. In addition, pixel information that the coordinate generation unit 93 outputs may be coordinate information of image data mutually having an association, or may be mutually independent coordinate information.

According to the above explanation, the image processing apparatus 5 pertaining to the fifth embodiment has the plurality of image processing calculation units, and thereby higher speed of processing by parallel processing can be achieved. In this case, the coordinate generation unit 93 preferably outputs the coordinate information of the image data mutually having the association. In addition, the image processing apparatus 5 can simultaneously process a plurality of image data by independently making operate the plurality of image processing calculation units. In this case, the coordinate generation unit 93 preferably outputs the mutually independent coordinate information. It is to be noted that also in the image processing apparatus 5 pertaining to the fifth embodiment, it is possible to provide the synchronization processing unit 46 pertaining to the fourth embodiment in each image processing calculation unit.

<Sixth Embodiment>

In a sixth embodiment, will be explained an image processing apparatus 6 in which the plurality of load processors 41 and pixel processing processors 43 of the first embodiment are provided, respectively. Therefore, in FIG. 20, shown is a block diagram of an image processing apparatus 6 pertaining to the sixth embodiment.

Figure 20:
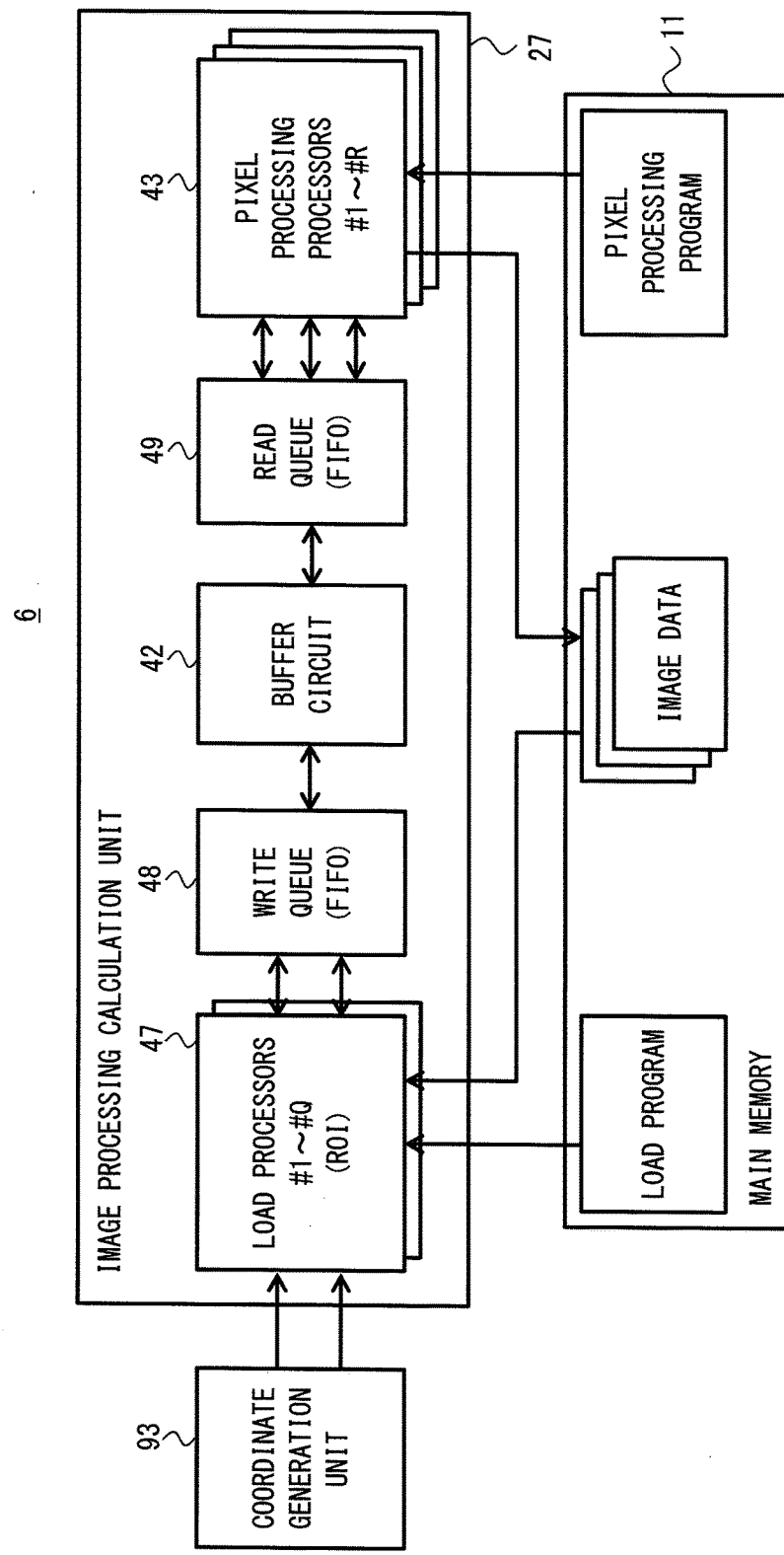
FIG. 20 is a block diagram of an image processing apparatus according to a sixth embodiment.

As shown in FIG. 20, the image processing apparatus 6 pertaining to the sixth embodiment has Q pieces of load processors 47 and R pieces of pixel processing processors 43. The load processor 47 is the processor in which the coordinate generation unit 50 is eliminated from the load processor 41. Therefore, also in the image processing apparatus 6 pertaining to the sixth embodiment, one coordinate generation unit 93 is provided with respect to the plurality of load processors 47. In addition, a write queue 48 and a read queue 49 are added to the image processing apparatus 6.

Buffer numbers indicating storage regions of the buffer circuit 42 having been in a writable state are sequentially accumulated in the write queue 48, and the write queue 48 presents the buffer numbers to the plurality of load processors 47 in accumulated order. Buffer numbers indicating storage regions of the buffer circuit 42 having been in a readable state are sequentially accumulated in the read queue 49, and the read queue 49 presents the buffer numbers to the plurality of pixel processing processors 43 in accumulated order. The write queue 48 and the read queue 49 are memories having a FIFO (First In First Out) configuration. These write queue 48 and read queue 49 are provided, and thereby read/write among the plurality of processors can be prevented from competing against one another.

In the image processing apparatus 6 pertaining to the sixth embodiment, the load processor 47 writes the pixel data PD in the data buffer 74 corresponding to the buffer number indicated by the write queue 48. At this time, in the buffer circuit 42, a lock flag corresponding to the data buffer 74 in which the pixel data PD has been written is made into the write inhibit state. In addition, a referenced buffer number is discarded in the write queue 48.

In addition, in the image processing apparatus 6 pertaining to the sixth embodiment, the pixel processing processor 43 reads the pixel data PD from the data buffer 74 corresponding to the buffer number indicated by the read queue 49. At this time, in the buffer circuit 42, a lock flag corresponding to the data buffer 74 from which the pixel data PD has been read is made into the read inhibit state. In addition, the referenced buffer number is discarded in the read queue 49.

According to the above explanation, the image processing apparatus 6 pertaining to the sixth embodiment has the plurality of load processors 47 and pixel processing processors 43, respectively. In addition, the number of load processors 47 and the number of pixel processing processors 43 can be respectively independently set. As a result of this, for example, when load processing is completed in a shorter time as compared with image processing, optimization of hardware resources, such as more reducing the number of load processors 47 as compared with the number of pixel processing processors 43, can be carried out. As a result of this, in the image processing apparatus 6 pertaining to the sixth embodiment, a circuit area can be reduced while processing capability is enhanced.

The first and sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor apparatus comprising:
   a memory interface which is connectable to a memory for storing pixel data;
   a first processor which is coupled to the memory interface, and which reads, in accordance with a scheme specified by a load program, the pixel data from the memory;
   a second processor which is coupled to the memory interface, and which processes, in accordance with a scheme specified by a pixel processing program, the pixel data read by the first processor to generate processed pixel data; and
   a buffer circuit which is coupled between the first and second processors, and which includes a buffer memory,
   wherein the first processor generates coordinate information of the pixel data to be read, and writes the pixel data read by a first memory access address generated based on the coordinate information and the coordinate information into the buffer memory,
   wherein the buffer circuit holds the pixel data and the coordinate information corresponding to the pixel data in the buffer memory, and
   wherein the second processor reads the pixel data and the coordinate information corresponding to the pixel data from the buffer memory, and writes the processed pixel data back to the memory in accordance with a second memory access address generated based on the coordinate information corresponding to the processed pixel data.

2. The semiconductor apparatus according to claim 1,
   wherein the load program and the pixel processing program are stored in the memory,
   wherein the first processor reads and executes the load program, and
   wherein the second processor reads and executes the pixel processing program.

3. The semiconductor apparatus according to claim 1,
   wherein the first processor comprises a coordinate generation unit which generates the coordinate information, and
   wherein the coordinate generation unit includes:
      an access mode setting circuit which outputs a mode setting value to set an access mode;
      a plurality of mode correspondence coordinate generation circuits which are provided corresponding to the access modes, and each of which generates the coordinate information corresponding to any one of the access modes; and
      a selector circuit which selects and outputs any one of the coordinate information which the plurality of mode correspondence coordinate generation circuits have output based on the mode setting value.

4. The semiconductor apparatus according to claim 1,
   wherein the second processor performs first processing for the pixel data read from a first region of the memory based on the first memory access address, and writes the pixel data which the first processing has been performed back to the first region of the memory based on the second memory access address.

5. The semiconductor apparatus according to claim 1,
   wherein the buffer circuit controls a writing of the pixel data and the coordinate information by the first processor in accordance with a write inhibit state of the buffer memory generated by the first processor and a write permission state of the buffer memory generated by the second processor.

6. The semiconductor apparatus according to claim 1,
   wherein the buffer circuit further comprises a lock flag register to store a lock flag indicating a write permission or inhibit state of the buffer memory,
   wherein the first processor writes the pixel data and the coordinate information corresponding to the pixel data in the buffer memory, and makes the lock flag register in a write inhibit state, and wherein the second processor reads the pixel data and the coordinate information corresponding to the pixel data from the buffer memory, and makes the lock flag register in the write permission state.

7. The semiconductor apparatus according to claim 1, wherein the buffer circuit further comprises:
a plurality of the buffer memories;
a lock flag register to store a lock flag indicating a write permission or inhibit state with respect to each of the plurality of the buffer memories;
a write pointer generation circuit which outputs a write pointer indicating the buffer memory to write in among the plurality of the buffer memories; and
a read pointer generation circuit which outputs a read pointer indicating the buffer memory to read from among the plurality of the buffer memories,
wherein, at the time of writing the pixel data and the coordinate information corresponding to the pixel data in the buffer memory which the write pointer indicates, the first processor makes in a write inhibit state the lock flag register corresponding to the buffer memory which the read pointer indicates, and increases a value of the write pointer, and
wherein, at the time of reading the pixel data and the coordinate information corresponding to the pixel data from the buffer memory which the read pointer indicates, the second processor makes in a write permission state the lock flag register corresponding to the buffer memory which the read pointer indicates, and increases a value of the read pointer.

8. The semiconductor apparatus according to claim 1, further comprising a synchronization processing circuitry which is coupled between the first and second processors, and which outputs a wait signal to stop read processing of the pixel data by the first processor based on an instruction from the second processor and a synchronization signal to instruct the first processor to perform the read processing of the pixel data according to a processing result of the second processor.

9. The semiconductor apparatus according to claim 1, wherein the first processor comprises a coordinate generation unit which generates the coordinate information,
wherein the semiconductor apparatus further comprises a plurality of image processing calculation units, each of the image processing calculation units including the first and second processors and the buffer circuit,
wherein the coordinate generation units of the image processing calculation units are standardized to be provided.

10. The semiconductor apparatus according to claim 1, further comprising:
a plurality of the first processors;
a plurality of the second processors;
a write queue in which buffer numbers indicating storage regions of the buffer circuit having been in a writable state are sequentially accumulated, and which presents the buffer numbers to the plurality of the first processors in accumulated order; and
a read queue in which buffer numbers indicating storage regions of the buffer circuit having been in a readable state are sequentially accumulated, and which presents the buffer numbers to the plurality of the second processors in accumulated order.

11. The semiconductor apparatus according to claim 1, wherein the first processor comprises:
a first coordinate register which holds the coordinate information;
a first image specifying register which holds an image specifying value to specify a number of an image to be processed; and
a first memory address circuit which is coupled to the first coordinate register and the first image specifying register, and which generates the first memory access address based on the coordinate information and the image specifying value,
wherein the second processor comprises:
a second coordinate register which holds the coordinate information output from the buffer memory;
a second image specifying register which holds the image specifying value; and
a second memory address circuit which is coupled to the second coordinate register and the second image specifying register, and which generates the second memory access address based on the coordinate information and the image specifying value.

12. A data processing method of a semiconductor apparatus which comprises a memory interface which is connectable to a memory for storing pixel data, a first processor which reads, in accordance with a scheme specified by a load program, the pixel data from the memory via the memory interface, a second processor which processes, in accordance with a scheme specified by a pixel processing program, the pixel data read by the first processor to generate processed pixel data, and a buffer memory, the data processing method comprising:
causing the first processor to generate coordinate information of the pixel data to be read, and to write the pixel data, read by a first memory access address generated based on the coordinate information and the coordinate information into the buffer memory;
holding the pixel data and the coordinate information corresponding to the pixel data in the buffer memory; and
causing the second processor to read the pixel data and the coordinate information corresponding to the pixel data from the buffer memory, and to write the processed pixel data back to the memory in accordance with a second memory access address generated based on the coordinate information corresponding to the processed pixel data.

13. The data processing method according to claim 12, wherein the load program and the pixel processing program are stored in the memory, the data processing method further comprising:
causing the first processor to read and to execute the load program; and
causing the second processor to read and to execute the pixel processing program.

14. The data processing method according to claim 12, further comprising causing the first processor to generate a mode setting value to set an access mode, and to generate the coordinate information based on the mode setting value.

15. The data processing method according to claim 12, further comprising causing the second processor to perform first processing for the pixel data read from a first region of the memory based on the first memory access address, and to write the pixel data which the first processing has been performed back to the first region of the memory based on the second memory access address.

16. The data processing method according to claim 12, further comprising:

making the buffer memory in a write inhibit state in response to a completion of write processing of the pixel data and the coordinate information corresponding to the pixel data by the first processor; and making the buffer memory in a write permission state in response to a completion of read processing of the pixel data and the coordinate information corresponding to the pixel data by the second processor.

17. The data processing method according to claim 12, wherein the semiconductor apparatus further comprises a plurality of the buffer memories, wherein the data processing method further comprises:

generating a lock flag indicating a write permission or inhibit state with respect to each of the plurality of the buffer memories;

generating a write pointer indicating the buffer memory to write in among the plurality of the buffer memories;

generating a read pointer indicating the buffer memory to read from among the plurality of the buffer memories;

causing, at the time of writing the pixel data and the coordinate information corresponding to the pixel data in the buffer memory which the write pointer indicates, the first processor to make in a write inhibit state the lock flag corresponding to the buffer memory which the read pointer indicates, and to increase a value of the write pointer; and causing, at the time of reading the pixel data and the coordinate information corresponding to the pixel data from the buffer memory which the read pointer indicates, the second processor to make in a write permission state the lock flag corresponding to the buffer memory which the read pointer indicates, and to increase a value of the read pointer.

18. The data processing method according to claim 12, further comprising:

stopping read processing of the pixel data by the first processor based on an instruction from the second processor; and instructing the first processor to perform the read processing of the pixel data according to a processing result of the second processor.

19. The data processing method according to claim 12, wherein the semiconductor apparatus further comprises:

a plurality of the first processors;

a plurality of the second processors;

a write queue which is coupled between the plurality of the first processors and the buffer memory; and a read queue which is coupled between the plurality of the second processors and the buffer memory, wherein the data processing method further comprises:

sequentially accumulating, in the write queue, buffer numbers indicating storage regions of the buffer memory having been in a writable state;

presenting the buffer numbers from the write queue to the plurality of the first processors in order accumulated in the write queue;

sequentially accumulating, in the read queue, buffer numbers indicating storage regions of the buffer memory having been in a readable state; and presenting the buffer numbers from the read queue to the plurality of the second processors in order accumulated in the read queue.

20. The data processing method according to claim 12, further comprising generating the first and second addresses based on the coordinate information and an image specifying value to specify a number of an image to be processed.

* * * * *